US009399959B2

(12) United States Patent
Whitney et al.

(10) Patent No.: US 9,399,959 B2
(45) Date of Patent: Jul. 26, 2016

(54) SYSTEM AND METHOD FOR ADJUSTING A TORQUE CAPACITY OF AN ENGINE USING MODEL PREDICTIVE CONTROL

(71) Applicant: GM Global Technology Operations LLC, Detroit, MI (US)

(72) Inventors: Christopher E. Whitney, Commerce, MI (US); Kevin C. Wong, Ann Arbor, MI (US); Gary Robert Cygan, Jr., Auburn Hills, MI (US); Alberto Bemporad, Lucca (IT); Daniele Bernardini, Siena (IT)

(73) Assignee: GM Global Technology Operations LLC, Detroit, MI (US)

( * ) Notice: Subject to any disclaimer, the term of this patent is extended or adjusted under 35 U.S.C. 154(b) by 285 days.

(21) Appl. No.: 14/225,516

(22) Filed: Mar. 26, 2014

(65) Prior Publication Data

US 2015/0275784 A1    Oct. 1, 2015

(51) Int. Cl.
*F02D 17/00*    (2006.01)
*F02D 28/00*    (2006.01)
(Continued)

(52) U.S. Cl.
CPC ............... *F02D 28/00* (2013.01); *F02D 13/02* (2013.01); *F02D 13/0207* (2013.01); *F02D 13/0219* (2013.01); *F02D 17/00* (2013.01); *F02D 17/02* (2013.01); *F02D 21/04* (2013.01); *F02D 29/02* (2013.01); *F02D 41/0002* (2013.01); *F02D 41/0087* (2013.01); *G05B 13/048* (2013.01); *F02D 11/105* (2013.01); *F02D 13/06* (2013.01); *F02D 41/005* (2013.01); *F02D 2041/001* (2013.01); *F02D 2041/002* (2013.01); *F02D 2041/0017* (2013.01); *F02D 2041/1412* (2013.01); *F02D 2041/1433* (2013.01); *F02D 2250/18* (2013.01)

(58) Field of Classification Search
CPC . F02D 13/0207; F02D 13/0211; F02D 13/06; F02D 17/00; F02D 17/02; F02D 41/0087
USPC ................................ 123/481, 198 F; 701/102
See application file for complete search history.

(56) References Cited

U.S. PATENT DOCUMENTS 4,161,929 A    7/1979   Nohira et al.
5,070,846 A   12/1991   Dudek et al.
(Continued)

FOREIGN PATENT DOCUMENTS

CN        1594846 A        3/2005
WO    WO-03-065135 A1     8/2003

OTHER PUBLICATIONS

John C. G. Boot; "Quadratic Programming: Algorithms, Anomalies, Applications vol. 2 of Studies in mathematical and managerial economics"; North-Holland Publ.Comp., 1964; 213 pages.
(Continued)

*Primary Examiner* — Erick Solis

(57) ABSTRACT

A system according to the principles of the present disclosure includes a desired capacity module, an anticipated torque request module, and an engine actuator module. The desired capacity module generates a desired torque capacity of an engine at a future time based on a present torque request and a maximum torque output of the engine. The anticipated torque request module generates an anticipated torque request based on the desired torque capacity. The engine actuator module controls an actuator of the engine at a present time based on the anticipated torque request.

20 Claims, 7 Drawing Sheets

(51) Int. Cl.

| | | |
|---|---|---|
| *F02D 17/02* | (2006.01) | |
| *F02D 41/00* | (2006.01) | |
| *F02D 13/02* | (2006.01) | |
| *F02D 21/04* | (2006.01) | |
| *F02D 29/02* | (2006.01) | |
| *G05B 13/04* | (2006.01) | |
| *F02D 13/06* | (2006.01) | |
| *F02D 11/10* | (2006.01) | |
| *F02D 41/14* | (2006.01) | |

(56) References Cited

U.S. PATENT DOCUMENTS

| | | |
|---|---|---|
| 5,101,786 A | 4/1992 | Kamio et al. |
| 5,293,553 A | 3/1994 | Dudek et al. |
| 5,706,780 A | 1/1998 | Shirakawa |
| 5,727,528 A | 3/1998 | Hori et al. |
| 5,775,293 A | 7/1998 | Kresse |
| 5,921,219 A | 7/1999 | Frohlich et al. |
| 6,014,955 A | 1/2000 | Hosotani et al. |
| 6,155,230 A | 12/2000 | Iwano et al. |
| 6,532,935 B2 | 3/2003 | Ganser et al. |
| 6,606,981 B2 | 8/2003 | Itoyama |
| 6,704,638 B2 | 3/2004 | Livshiz et al. |
| 6,714,852 B1 | 3/2004 | Lorenz et al. |
| 6,826,904 B2 | 12/2004 | Miura |
| 6,840,215 B1 | 1/2005 | Livshiz et al. |
| 6,985,809 B2 | 1/2006 | Yasui |
| 7,016,779 B2 | 3/2006 | Bowyer |
| 7,021,282 B1 | 4/2006 | Livshiz et al. |
| 7,051,058 B2 | 5/2006 | Wagner et al. |
| 7,076,953 B2 | 7/2006 | Kreso |
| 7,225,782 B2 * | 6/2007 | Pallett .................. B60W 10/06 123/192.1 |
| 7,274,986 B1 | 9/2007 | Petridis et al. |
| 7,275,374 B2 | 10/2007 | Stewart et al. |
| 7,328,577 B2 | 2/2008 | Stewart et al. |
| 7,395,147 B2 | 7/2008 | Livshiz et al. |
| 7,400,967 B2 | 7/2008 | Ueno et al. |
| 7,433,775 B2 | 10/2008 | Livshiz et al. |
| 7,441,544 B2 | 10/2008 | Hagari |
| 7,472,692 B2 | 1/2009 | Nakagawa et al. |
| 7,614,384 B2 | 11/2009 | Livshiz et al. |
| 7,650,225 B2 | 1/2010 | Nakagawa et al. |
| 7,703,439 B2 | 4/2010 | Russell et al. |
| 7,715,975 B2 | 5/2010 | Yamaoka et al. |
| 7,775,195 B2 | 8/2010 | Schondorf et al. |
| 7,783,409 B2 | 8/2010 | Kang et al. |
| 7,813,869 B2 | 10/2010 | Grichnik et al. |
| 7,885,756 B2 | 2/2011 | Livshiz et al. |
| 7,941,260 B2 | 5/2011 | Lee et al. |
| 7,967,720 B2 | 6/2011 | Martin et al. |
| 8,041,487 B2 | 10/2011 | Worthing et al. |
| 8,050,841 B2 | 11/2011 | Costin et al. |
| 8,073,610 B2 | 12/2011 | Heap et al. |
| 8,103,425 B2 | 1/2012 | Choi et al. |
| 8,103,428 B2 | 1/2012 | Russ et al. |
| 8,116,954 B2 | 2/2012 | Livshiz et al. |
| 8,176,735 B2 | 5/2012 | Komatsu |
| 8,255,139 B2 | 8/2012 | Whitney et al. |
| 8,307,814 B2 | 11/2012 | Leroy et al. |
| 8,447,492 B2 | 5/2013 | Watanabe et al. |
| 8,468,821 B2 | 6/2013 | Liu et al. |
| 8,483,935 B2 | 7/2013 | Whitney et al. |
| 8,560,204 B2 | 10/2013 | Simon, Jr. et al. |
| 8,739,766 B2 | 6/2014 | Jentz et al. |
| 8,862,248 B2 | 10/2014 | Yasui |
| 8,954,257 B2 | 2/2015 | Livshiz et al. |
| 9,052,997 B2 | 6/2015 | Ono |
| 9,062,631 B2 | 6/2015 | Kinugawa et al. |
| 9,075,406 B2 | 7/2015 | Nakada |
| 9,127,614 B2 | 9/2015 | Ueno et al. |
| 9,145,841 B2 | 9/2015 | Miyazaki et al. |
| 9,175,628 B2 | 11/2015 | Livshiz et al. |
| 9,243,524 B2 | 1/2016 | Whitney et al. |
| 2002/0038647 A1 | 4/2002 | Tashiro et al. |
| 2002/0078924 A1 | 6/2002 | Yagi |
| 2002/0179050 A1 | 12/2002 | Soliman et al. |
| 2003/0074892 A1 | 4/2003 | Miura |
| 2003/0110760 A1 | 6/2003 | Shirakawa |
| 2003/0145836 A1 | 8/2003 | Linna et al. |
| 2004/0116220 A1 | 6/2004 | Yamamoto et al. |
| 2005/0065691 A1 | 3/2005 | Cho |
| 2005/0131620 A1 | 6/2005 | Bowyer |
| 2005/0166900 A1 | 8/2005 | Song et al. |
| 2005/0171670 A1 | 8/2005 | Yoshioka et al. |
| 2005/0193739 A1 | 9/2005 | Brunell et al. |
| 2005/0204726 A1 * | 9/2005 | Lewis .................. F02D 13/06 60/285 |
| 2005/0267608 A1 | 12/2005 | Nishira et al. |
| 2006/0137335 A1 | 6/2006 | Stewart et al. |
| 2006/0199699 A1 | 9/2006 | Berglund et al. |
| 2007/0068159 A1 | 3/2007 | Ueno et al. |
| 2007/0174003 A1 | 7/2007 | Ueno et al. |
| 2008/0127938 A1 | 6/2008 | Hagari |
| 2008/0271718 A1 | 11/2008 | Schondorf et al. |
| 2008/0308066 A1 | 12/2008 | Martin et al. |
| 2009/0018733 A1 | 1/2009 | Livshiz et al. |
| 2009/0033264 A1 | 2/2009 | Falkenstein |
| 2009/0037066 A1 | 2/2009 | Kuwahara et al. |
| 2009/0037073 A1 * | 2/2009 | Jung .................. F02D 41/102 701/101 |
| 2009/0118968 A1 | 5/2009 | Livshiz et al. |
| 2009/0118969 A1 | 5/2009 | Heap et al. |
| 2009/0118972 A1 | 5/2009 | Baur et al. |
| 2009/0143959 A1 | 6/2009 | Yamaoka et al. |
| 2009/0229562 A1 | 9/2009 | Ramappan et al. |
| 2009/0292435 A1 | 11/2009 | Costin et al. |
| 2010/0049419 A1 | 2/2010 | Yoshikawa et al. |
| 2010/0057283 A1 | 3/2010 | Worthing et al. |
| 2010/0057329 A1 | 3/2010 | Livshiz et al. |
| 2010/0075803 A1 | 3/2010 | Sharples et al. |
| 2010/0116249 A1 | 5/2010 | Guerrassi et al. |
| 2010/0116250 A1 * | 5/2010 | Simon, Jr. .............. B60L 11/14 123/436 |
| 2010/0180876 A1 | 7/2010 | Leroy et al. |
| 2010/0211294 A1 | 8/2010 | Soejima |
| 2010/0263627 A1 | 10/2010 | Whitney et al. |
| 2010/0268436 A1 | 10/2010 | Soejima et al. |
| 2010/0280738 A1 | 11/2010 | Whitney et al. |
| 2011/0034298 A1 | 2/2011 | Doering et al. |
| 2011/0045948 A1 | 2/2011 | Doering et al. |
| 2011/0066308 A1 | 3/2011 | Yang et al. |
| 2011/0087421 A1 | 4/2011 | Soejima et al. |
| 2011/0100013 A1 | 5/2011 | Whitney et al. |
| 2011/0113773 A1 | 5/2011 | Liu et al. |
| 2011/0144838 A1 | 6/2011 | Matthews et al. |
| 2011/0264353 A1 | 10/2011 | Atkinson et al. |
| 2012/0065864 A1 | 3/2012 | Whitney et al. |
| 2012/0150399 A1 | 6/2012 | Kar et al. |
| 2012/0203434 A1 | 8/2012 | Sujan et al. |
| 2012/0296557 A1 * | 11/2012 | Ramappan .......... F02D 13/0219 701/105 |
| 2013/0032123 A1 | 2/2013 | Kinugawa et al. |
| 2013/0032127 A1 | 2/2013 | Jentz et al. |
| 2013/0060448 A1 | 3/2013 | Nakada |
| 2013/0080023 A1 | 3/2013 | Livshiz et al. |
| 2013/0104859 A1 | 5/2013 | Miyazaki et al. |
| 2013/0151124 A1 | 6/2013 | Seiberlich et al. |
| 2013/0184961 A1 | 7/2013 | Kumar et al. |
| 2013/0213353 A1 | 8/2013 | Rollinger et al. |
| 2014/0076279 A1 | 3/2014 | Livshiz et al. |
| 2014/0174413 A1 | 6/2014 | Huang et al. |
| 2014/0174414 A1 | 6/2014 | Huang et al. |
| 2014/0311446 A1 | 10/2014 | Whitney et al. |
| 2014/0316681 A1 | 10/2014 | Whitney et al. |
| 2014/0316682 A1 | 10/2014 | Whitney et al. |
| 2014/0316683 A1 | 10/2014 | Whitney et al. |
| 2015/0039206 A1 | 2/2015 | Storch et al. |
| 2015/0275569 A1 | 10/2015 | LeBlanc |
| 2015/0275711 A1 | 10/2015 | Whitney et al. |
| 2015/0275771 A1 | 10/2015 | Pochner et al. |
| 2015/0275772 A1 | 10/2015 | Long et al. |
| 2015/0275783 A1 | 10/2015 | Wong et al. |

(56) References Cited

U.S. PATENT DOCUMENTS

| | | |
|---|---|---|
| 2015/0275784 A1 | 10/2015 | Whitney et al. |
| 2015/0275785 A1 | 10/2015 | Cygan, Jr. et al. |
| 2015/0275786 A1 | 10/2015 | Jin et al. |
| 2015/0275789 A1 | 10/2015 | Cygan, Jr. et al. |
| 2015/0275792 A1 | 10/2015 | Genslak et al. |
| 2015/0275794 A1 | 10/2015 | Verdejo et al. |
| 2015/0275795 A1 | 10/2015 | Cygan, Jr. et al. |
| 2015/0275796 A1 | 10/2015 | Pochner et al. |
| 2015/0275806 A1 | 10/2015 | Genslak et al. |

OTHER PUBLICATIONS

U.S. Appl. No. 14/617,068, filed Feb. 9, 2015, Whitney et al.
U.S. Appl. No. 14/931,134, filed Nov. 3, 2015, Wong et al.
U.S. Appl. No. 13/613,588, filed Sep. 13, 2012, Livshiz et al.
U.S. Appl. No. 13/613,683, filed Sep. 13, 2012, Livshiz et al.
U.S. Appl. No. 13/686,069, filed Nov. 27, 2012, Livshiz et al.
U.S. Appl. No. 13/911,121, filed Jun. 6, 2013, Whitney et al.
U.S. Appl. No. 13/911,132, filed Jun. 6, 2013, Whitney et al.
U.S. Appl. No. 13/911,148, filed Jun. 6, 2013, Whitney et al.
U.S. Appl. No. 13/911,156, filed Jun. 6, 2013, Whitney et al.
U.S. Appl. No. 14/032,508, filed Sep. 20, 2013, Storch et al.
U.S. Appl. No. 14/225,492, filed Mar. 26, 2014, Wong et al.
U.S. Appl. No. 14/225,496, filed Mar. 26, 2014, Pochner et al.
U.S. Appl. No. 14/225,502, filed Mar. 26, 2014, Long et al.
U.S. Appl. No. 14/225,507, filed Mar. 26, 2014, Jin et al.
U.S. Appl. No. 14/225,531, filed Mar. 26, 2014, Genslak et al.
U.S. Appl. No. 14/225,569, filed Mar. 26, 2014, Long et al.
U.S. Appl. No. 14/225,587, filed Mar. 26, 2014, Cygan Jr. et al.
U.S. Appl. No. 14/225,626, filed Mar. 26, 2014, Verdejo et al.
U.S. Appl. No. 14/225,808, filed Mar. 26, 2014, Whitney et al.
U.S. Appl. No. 14/225,817, filed Mar. 26, 2014, Cygan Jr. et al.
U.S. Appl. No. 14/225,891, filed Mar. 26, 2014, Genslak et al.
U.S. Appl. No. 14/225,896, filed Mar. 26, 2014, Cygan Jr. et al.
U.S. Appl. No. 14/226,006, filed Mar. 26, 2014, Pochner et al.
U.S. Appl. No. 14/226,121, filed Mar. 26, 2014, Wong et al.
Kolmanovsky, I., "Towards Engine and Powertrain Control Based on Model Predictive Control," (Sep. 28, 2012), Powerpoint Presentation, 47 slides.
John C. G. Boot; "Quadratic Programming: Algorithms, Anomalies, Applications Volume 2 of Studies in mathematical and managerial economics"; North-Holland Publ.Comp., 1964; 213 pages.
N. Lawrence Ricker; "Use of quadratic programming for constrained internal model control"; Ind. Eng. Chem. Process Des. Dev., 1985, pp. 925-936.
C. E. Lemke; "A Method of Solution for Quadratic Programs"; Rensselaer Polytechnic Institute, Troy, New York, Published Online: Jul. 1, 1962, pp. 442-453.
U.S. Appl. No. 14/675,828, filed Apr. 1, 2015, Long et al.
U.S. Appl. No. 14/675,860, filed Apr. 2015, Long et al.
U.S. Appl. No. 14/309,047, filed Jun. 19, 2014, Jose C. Zavala Jurado et al.

\* cited by examiner

SYSTEM AND METHOD FOR ADJUSTING A TORQUE CAPACITY OF AN ENGINE USING MODEL PREDICTIVE CONTROL

CROSS-REFERENCE TO RELATED APPLICATIONS

This application is related to U.S. patent application Ser. No. 14/225,502 filed on Mar. 26, 2014, Ser. No. 14/225,569 filed on Mar. 26, 2014, Ser. No. 14/225,626 filed on Mar. 26, 2014, Ser. No. 14/225,817 filed on Mar. 26, 2014, Ser. No. 14/225,896 filed on Mar. 26, 2014, Ser. No. 14/225,531 filed on Mar. 26, 2014, Ser. No. 14/225,507 filed on Mar. 26, 2014, Ser. No. 14/225,808 filed on Mar. 26, 2014, Ser. No. 14/225,587 filed on Mar. 26, 2014, Ser. No. 14/225,492 filed on Mar. 26, 2014, Ser. No. 14/226,006 filed on Mar. 26, 2014, Ser. No. 14/226,121 filed on Mar. 26, 2014, Ser. No. 14/225,496 filed on Mar. 26, 2014, and Ser. No. 14/225,891 filed on Mar. 26, 2014. The entire disclosure of the above applications are incorporated herein by reference.

FIELD

The present disclosure relates to internal combustion engines, and more particularly, to systems and methods for adjusting a torque capacity of an engine using model predictive control.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders increases the torque output of the engine.

In spark-ignition engines, spark initiates combustion of an air/fuel mixture provided to the cylinders. In compression-ignition engines, compression in the cylinders combusts the air/fuel mixture provided to the cylinders. Spark timing and air flow may be the primary mechanisms for adjusting the torque output of spark-ignition engines, while fuel flow may be the primary mechanism for adjusting the torque output of compression-ignition engines.

Engine control systems have been developed to control engine output torque to achieve a desired torque. Traditional engine control systems, however, do not control the engine output torque as accurately as desired. Further, traditional engine control systems do not provide a rapid response to control signals or coordinate engine torque control among various devices that affect the engine output torque.

SUMMARY

A system according to the principles of the present disclosure includes a desired capacity module, an anticipated torque request module, and an engine actuator module. The desired capacity module generates a desired torque capacity of an engine at a future time based on a present torque request and a maximum torque output of the engine. The anticipated torque request module generates an anticipated torque request based on the desired torque capacity. The engine actuator module controls an actuator of the engine at a present time based on the anticipated torque request.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
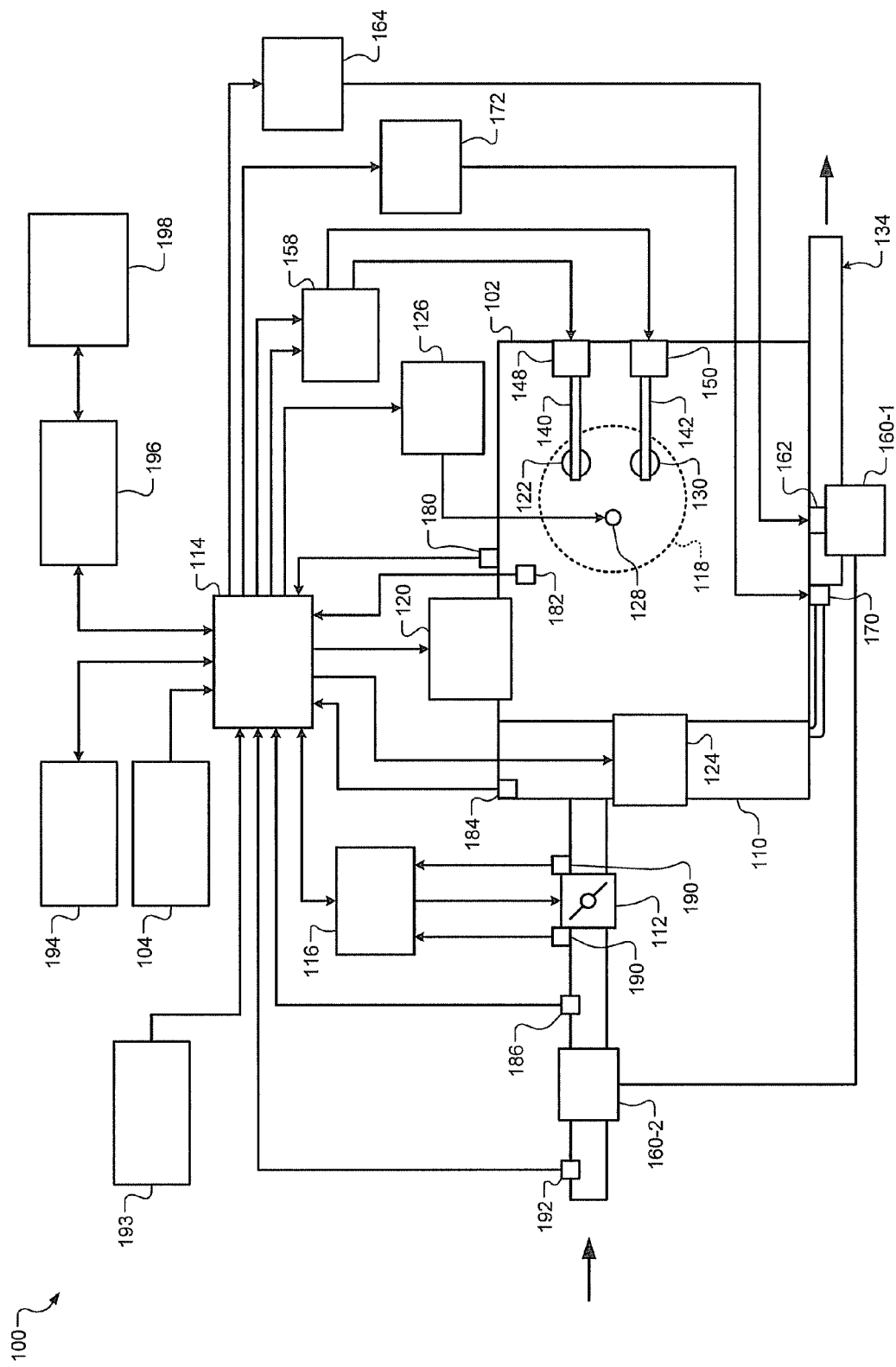
FIG. 1 is a functional block diagram of an example engine system according to the present disclosure.

An engine control module (ECM) controls torque output of an engine. More specifically, the ECM determines target values for actuators of the engine based on a requested amount of torque and controls the actuators based on the target values. For example, the ECM controls intake and exhaust camshaft phasing based on target intake and exhaust phaser angles, a throttle valve based on a target throttle opening, an exhaust gas recirculation (EGR) valve based on a target EGR opening, and a wastegate of a turbocharger based on a target wastegate duty cycle.

The ECM could determine the target values individually using multiple single input single output (SISO) controllers, such as proportional integral derivative (PID) controllers. However, when multiple SISO controllers are used, the target values may be set to maintain system stability at the expense of possible fuel consumption decreases. Additionally, calibration and design of the individual SISO controllers may be costly and time consuming.

The ECM of the present disclosure generates the target values using model predictive control (MPC). More specifically, the ECM identifies possible sets of target values based on an engine torque request. The ECM determines predicted parameters for each of the possible sets based on the possible sets' target values and a mathematical model of the engine. For example, the ECM determines a predicted engine output torque and a predicted air per cylinder (APC) for each of the possible sets of target values. The ECM may also determine one or more other predicted parameters for each possible set of target values.

The ECM may determine, a cost associated with use of each of the possible sets. The ECM determines the cost based on a first difference between the predicted engine output torque determined for that possible set and the engine torque request. The cost determined for a possible set increases as a magnitude of the first difference increases and vice versa.

The ECM may select the one of the possible sets having the lowest cost. In this manner, the ECM may select the one of the possible sets that is predicted to most closely track the engine torque request. The ECM sets the target values for controlling the engine actuators using the target values of the selected possible set. In various implementations, instead of or in addition to identifying possible sets of target values and determining the cost of each of the sets, the ECM may generate a surface representing the cost of possible sets of target values. The ECM may then identify the possible set that has the lowest cost based on the slope of the cost surface.

The ECM adjusts the torque capacity of the engine by activating or deactivating cylinders of the engine and/or adjusting the amount by which intake and exhaust valves of the engine are lifted. In one example, the ECM switches the torque capacity of the engine from full capacity to a reduced capacity by deactivating half of the cylinders of the engine. In another example, the ECM switches the torque capacity of the engine from full capacity to a reduced capacity by adjusting the amount by which the intake and exhaust valves are lifted from a first amount to a second amount that is less than the first amount.

When the ECM adjusts the torque capacity of the engine, the relationship between the torque output of the engine and the target values changes. For example, when the ECM switches operation of the engine from full capacity to the reduced capacity, the amount of airflow per cylinder required to achieve a given torque output may increase. Therefore, the ECM may select the mathematical model from a plurality of models that each corresponds to a certain torque capacity, and the ECM may determine the predicted parameters based on the mathematical model selected. As a result, the ECM may adjust the target values based on the torque capacity of the engine. For example, when the ECM switches operation of the engine from full capacity to the reduced capacity, the ECM may adjust the target intake and exhaust phaser angles to increase the amount of airflow per cylinder.

There may be a lag or delay between the time when the ECM adjusts the torque capacity of the engine to a new capacity and the time when the actuators are adjusted to satisfy the engine torque request at the new capacity. To reduce this delay, the ECM generates a desired torque capacity of the engine at a future time, generates an anticipated torque trajectory based on the desired torque capacity, and adjusts the target values based on the anticipated torque trajectory. For example, when the ECM switches operation of the engine from full capacity to the reduced capacity, the ECM may adjust the anticipated torque trajectory to reflect an anticipated torque increase.

The ECM may adjust the actuators in a manner that satisfies both the current engine torque request and the anticipated torque trajectory. For example, the ECM may adjust slow actuators such as the throttle valve in response to the anticipated torque trajectory, and adjust fast actuators such as the intake and exhaust cam phasers to avoid overshooting the current engine torque request. Then, when the torque capacity of the engine is actually adjusted, the ECM may adjust the fast actuators to satisfy the current engine torque request with minimal delay.

To further reduce the torque response lag associated with adjusting the torque capacity, the ECM may generate a model torque capacity and select the mathematical model used to determine the predicted parameters based on the model torque capacity. The ECM may switch the model torque capacity to a new capacity, and therefore start adjusting the target values based on the new capacity, before the ECM actually switches the torque capacity of the engine to the new capacity.

Referring now to FIG. 1, an engine system 100 includes an engine 102 that combusts an air/fuel mixture to produce drive torque for a vehicle. The amount of drive torque produced by the engine 102 is based on a driver input from a driver input module 104. The engine 102 may be a gasoline spark ignition internal combustion engine.

Air is drawn into an intake manifold 110 through a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders, which may improve fuel economy under certain engine operating conditions.

The engine 102 may operate using a four-stroke cycle. The four strokes, described below, may be referred to as the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection to achieve a target air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. A spark actuator module 126 energizes a spark plug 128 in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. Generating spark may be referred to as a firing event. The spark actuator module 126 may have the ability to vary the timing of the spark for each firing event. The spark actuator module 126 may vary the spark timing for a next firing event when the spark timing is changed between a last firing event and the next firing event. The spark actuator module 126 may halt provision of spark to deactivated cylinders.

During the combustion stroke, the combustion of the air/fuel mixture drives the piston away from TDC, thereby driving the crankshaft. The combustion stroke may be defined as the time between the piston reaching TDC and the time at which the piston reaches bottom dead center (BDC). During the exhaust stroke, the piston begins moving away from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118). In various other implementations, the intake valve 122 and/or the exhaust valve 130 may be controlled by devices other than camshafts, such as camless valve actuators. The cylinder actuator module 120 may deactivate the cylinder 118 by disabling opening of the intake valve 122 and/or the exhaust valve 130.

The time when the intake valve 122 is opened may be varied with respect to piston TDC by an intake cam phaser 148. The time when the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. When implemented, variable valve lift (not shown) may also be controlled by the phaser actuator module 158.

The engine system 100 may include a turbocharger that includes a hot turbine 160-1 that is powered by hot exhaust gases flowing through the exhaust system 134. The turbocharger also includes a cold air compressor 160-2 that is driven by the turbine 160-1. The compressor 160-2 compresses air leading into the throttle valve 112. In various implementations, a supercharger (not shown), driven by the crankshaft, may compress air from the throttle valve 112 and deliver the compressed air to the intake manifold 110.

A wastegate 162 may allow exhaust to bypass the turbine 160-1, thereby reducing the boost (the amount of intake air compression) provided by the turbocharger. A boost actuator module 164 may control the boost of the turbocharger by controlling opening of the wastegate 162. In various implementations, two or more turbochargers may be implemented and may be controlled by the boost actuator module 164.

An air cooler (not shown) may transfer heat from the compressed air charge to a cooling medium, such as engine coolant or air. An air cooler that cools the compressed air charge using engine coolant may be referred to as an intercooler. An air cooler that cools the compressed air charge using air may be referred to as a charge air cooler. The compressed air charge may receive heat, for example, via compression and/or from components of the exhaust system 134. Although shown separated for purposes of illustration, the turbine 160-1 and the compressor 160-2 may be attached to each other, placing intake air in close proximity to hot exhaust.

The engine system 100 may include an exhaust gas recirculation (EGR) valve 170, which selectively redirects exhaust gas back to the intake manifold 110. The EGR valve 170 may be located upstream of the turbocharger's turbine 160-1. The EGR valve 170 may be controlled by an EGR actuator module 172 based on signals from the ECM 114.

A position of the crankshaft may be measured using a crankshaft position (CKP) sensor 180. A rotational speed of the crankshaft (an engine speed) may be determined based on the crankshaft position. A temperature of the engine coolant may be measured using an engine coolant temperature (ECT) sensor 182. The ECT sensor 182 may be located within the engine 102 or at other locations where the coolant is circulated, such as a radiator (not shown).

A pressure within the intake manifold 110 may be measured using a manifold absolute pressure (MAP) sensor 184. In various implementations, engine vacuum, which is the difference between ambient air pressure and the pressure within the intake manifold 110, may be measured. A mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. An ambient temperature of air being drawn into the engine 102 may be measured using an intake air temperature (IAT) sensor 192. The engine system 100 may also include one or more other sensors 193, such as an ambient humidity sensor, a barometric pressure sensor, one or more knock sensors, a compressor outlet pressure sensor and/or a throttle inlet air pressure (TIAP) sensor, a wastegate position sensor, an EGR position sensor, and/or one or more other suitable sensors. The TIAP sensor may measure the pressure downstream from the compressor 160-2 and upstream from the throttle valve 112. The ECM 114 may use signals from the sensors to make control decisions for the engine system 100.

The ECM 114 may communicate with a transmission control module 194 to coordinate shifting gears in a transmission (not shown). For example, the ECM 114 may reduce engine torque during a gear shift. The ECM 114 may communicate with a hybrid control module 196 to coordinate operation of the engine 102 and an electric motor 198.

The electric motor 198 may also function as a generator, and may be used to produce electrical energy for use by vehicle electrical systems and/or for storage in a battery. In various implementations, various functions of the ECM 114, the transmission control module 194, and the hybrid control module 196 may be integrated into one or more modules.

Each system that varies an engine parameter may be referred to as an engine actuator. For example, the throttle actuator module 116 may adjust opening of the throttle valve 112 to achieve a target throttle opening area. The spark actuator module 126 controls the spark plugs to achieve a target spark timing relative to piston TDC. The fuel actuator module 124 controls the fuel injectors to achieve target fueling parameters. The phaser actuator module 158 may control the intake and exhaust cam phasers 148 and 150 to achieve target intake and exhaust cam phaser angles, respectively. The EGR actuator module 172 may control the EGR valve 170 to achieve a target EGR opening area. The boost actuator module 164 controls the wastegate 162 to achieve a target wastegate opening area. The capacity actuator module 120 controls cylinder deactivation to achieve a target number of activated or deactivated cylinders.

The ECM 114 generates the target values for the engine actuators to cause the engine 102 to generate a target engine output torque. The ECM 114 generates the target values for the engine actuators using model predictive control, as discussed further below.

Figure 2:
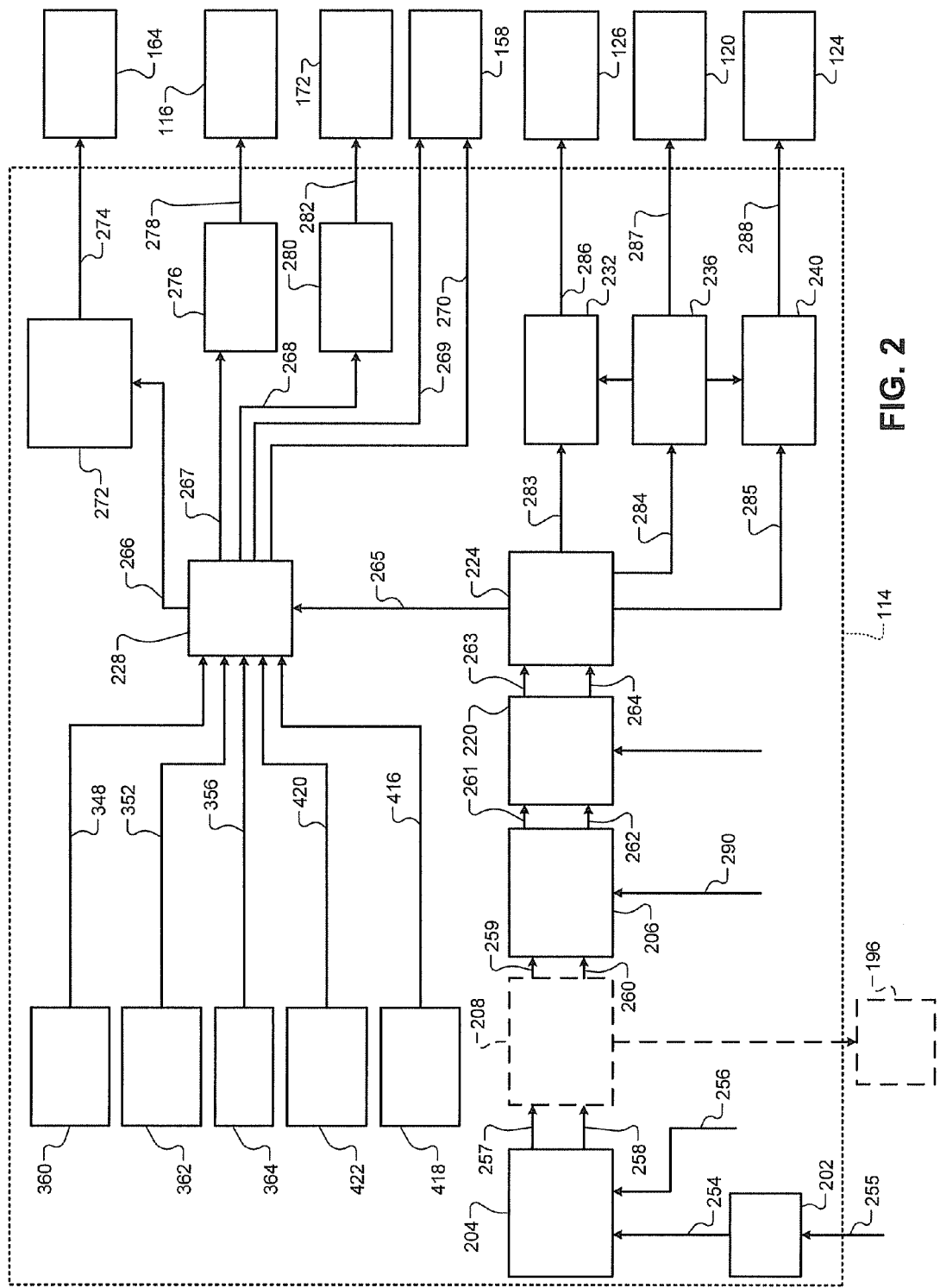
FIG. 2 is a functional block diagram of an example engine control system according to the present disclosure.

Referring now to FIG. 2, an example implementation of the ECM 114 includes a driver torque module 202, an axle torque arbitration module 204, and a propulsion torque arbitration module 206. The ECM 114 may include a hybrid optimization module 208. The ECM 114 may also include a reserves/loads module 220, a torque requesting module 224, an air control module 228, a spark control module 232, a capacity control module 236, and/or a fuel control module 240.

The driver torque module 202 may determine a driver torque request 254 based on a driver input 255 from the driver input module 104. The driver input 255 may be based on, for example, a position of an accelerator pedal and/or a position of a brake pedal. The driver input 255 may also be based on a cruise control system, which may be an adaptive cruise control system that varies vehicle speed to maintain a predetermined following distance. The driver torque module 202 may store one or more mappings of accelerator pedal position to target torque and may determine the driver torque request 254 based on a selected one of the mappings.

An axle torque arbitration module 204 arbitrates between the driver torque request 254 and other axle torque requests 256. Axle torque (torque at the wheels) may be produced by various sources including an engine and/or an electric motor. For example, the axle torque requests 256 may include a torque reduction requested by a traction control system when positive wheel slip is detected. Positive wheel slip occurs when axle torque overcomes friction between the wheels and the road surface, and the wheels begin to slip against the road surface. The axle torque requests 256 may also include a torque increase request to counteract negative wheel slip, where a tire of the vehicle slips in the other direction with respect to the road surface because the axle torque is negative.

The axle torque requests 256 may also include brake management requests and vehicle over-speed torque requests. Brake management requests may reduce axle torque to ensure that the axle torque does not exceed the ability of the brakes to hold the vehicle when the vehicle is stopped. Vehicle over-speed torque requests may reduce the axle torque to prevent the vehicle from exceeding a predetermined speed. The axle torque requests 256 may also be generated by vehicle stability control systems.

The axle torque arbitration module 204 outputs a predicted torque request 257 and an immediate torque request 258 based on the results of arbitrating between the received torque requests 254 and 256. As described below, the predicted and immediate torque requests 257 and 258 from the axle torque arbitration module 204 may selectively be adjusted by other modules of the ECM 114 before being used to control the engine actuators.

In general terms, the immediate torque request 258 may be an amount of currently desired axle torque, while the predicted torque request 257 may be an amount of axle torque that may be needed on short notice. The ECM 114 controls the engine system 100 to produce an axle torque equal to the immediate torque request 258. However, different combinations of target values may result in the same axle torque. The ECM 114 may therefore adjust the target values to enable a faster transition to the predicted torque request 257, while still maintaining the axle torque at the immediate torque request 258.

In various implementations, the predicted torque request 257 may be set based on the driver torque request 254. The immediate torque request 258 may be set to less than the predicted torque request 257 under some circumstances, such as when the driver torque request 254 is causing wheel slip on an icy surface. In such a case, a traction control system (not shown) may request a reduction via the immediate torque request 258, and the ECM 114 reduces the engine torque output to the immediate torque request 258. However, the ECM 114 performs the reduction so the engine system 100 can quickly resume producing the predicted torque request 257 once the wheel slip stops.

In general terms, the difference between the immediate torque request 258 and the (generally higher) predicted torque request 257 can be referred to as a torque reserve. The torque reserve may represent the amount of additional torque (above the immediate torque request 258) that the engine system 100 can begin to produce with minimal delay. Fast engine actuators are used to increase or decrease current axle torque with minimal delay. Fast engine actuators are defined in contrast with slow engine actuators.

In general terms, fast engine actuators can change the axle torque more quickly than slow engine actuators. Slow actuators may respond more slowly to changes in their respective target values than fast actuators do. For example, a slow actuator may include mechanical components that require time to move from one position to another in response to a change in target value. A slow actuator may also be characterized by the amount of time it takes for the axle torque to begin to change once the slow actuator begins to implement the changed target value. Generally, this amount of time will be longer for slow actuators than for fast actuators. In addition, even after beginning to change, the axle torque may take longer to fully respond to a change in a slow actuator.

For example only, the spark actuator module 126 may be a fast actuator. Spark-ignition engines may combust fuels including, for example, gasoline and ethanol, by applying a spark. By way of contrast, the throttle actuator module 116 may be a slow actuator.

For example, as described above, the spark actuator module 126 can vary the spark timing for a next firing event when the spark timing is changed between a last firing event and the next firing event. By way of contrast, changes in throttle opening take longer to affect engine output torque. The throttle actuator module 116 changes the throttle opening by adjusting the angle of the blade of the throttle valve 112. Therefore, when the target value for opening of the throttle valve 112 is changed, there is a mechanical delay as the throttle valve 112 moves from its previous position to a new position in response to the change. In addition, air flow changes based on the throttle opening are subject to air transport delays in the intake manifold 110. Further, increased air flow in the intake manifold 110 is not realized as an increase in engine output torque until the cylinder 118 receives additional air in the next intake stroke, compresses the additional air, and commences the combustion stroke.

Using these actuators as an example, a torque reserve can be created by setting the throttle opening to a value that would allow the engine 102 to produce the predicted torque request 257. Meanwhile, the spark timing can be set based on the immediate torque request 258, which is less than the predicted torque request 257. Although the throttle opening generates enough air flow for the engine 102 to produce the predicted torque request 257, the spark timing is retarded (which reduces torque) based on the immediate torque request 258. The engine output torque will therefore be equal to the immediate torque request 258.

When additional torque is needed, the spark timing can be set based on the predicted torque request 257 or a torque between the predicted and immediate torque requests 257 and 258. By the following firing event, the spark actuator module 126 may return the spark timing to an optimum value, which allows the engine 102 to produce full engine output torque achievable with the air flow already present. The engine output torque may therefore be quickly increased to the predicted torque request 257 without experiencing delays from changing the throttle opening.

The axle torque arbitration module 204 may output the predicted torque request 257 and the immediate torque request 258 to a propulsion torque arbitration module 206. In various implementations, the axle torque arbitration module 204 may output the predicted and immediate torque requests 257 and 258 to the hybrid optimization module 208.

The hybrid optimization module 208 may determine how much torque should be produced by the engine 102 and how much torque should be produced by the electric motor 198. The hybrid optimization module 208 then outputs modified predicted and immediate torque requests 259 and 260, respectively, to the propulsion torque arbitration module 206. In various implementations, the hybrid optimization module 208 may be implemented in the hybrid control module 196.

The predicted and immediate torque requests received by the propulsion torque arbitration module 206 are converted from an axle torque domain (torque at the wheels) into a propulsion torque domain (torque at the crankshaft). This conversion may occur before, after, as part of, or in place of the hybrid optimization module 208.

The propulsion torque arbitration module 206 arbitrates between propulsion torque requests 290, including the converted predicted and immediate torque requests. The propulsion torque arbitration module 206 generates an arbitrated predicted torque request 261 and an arbitrated immediate torque request 262. The arbitrated torque requests 261 and 262 may be generated by selecting a winning request from among received torque requests. Alternatively or additionally, the arbitrated torque requests may be generated by modifying one of the received requests based on another one or more of the received torque requests.

For example, the propulsion torque requests 290 may include torque reductions for engine over-speed protection, torque increases for stall prevention, and torque reductions requested by the transmission control module 194 to accommodate gear shifts. The propulsion torque requests 290 may also result from clutch fuel cutoff, which reduces the engine output torque when the driver depresses the clutch pedal in a manual transmission vehicle to prevent a flare in engine speed.

The propulsion torque requests 290 may also include an engine shutoff request, which may be initiated when a critical fault is detected. For example only, critical faults may include detection of vehicle theft, a stuck starter motor, electronic throttle control problems, and unexpected torque increases. In various implementations, when an engine shutoff request is present, arbitration selects the engine shutoff request as the winning request. When the engine shutoff request is present, the propulsion torque arbitration module 206 may output zero as the arbitrated predicted and immediate torque requests 261 and 262.

In various implementations, an engine shutoff request may simply shut down the engine 102 separately from the arbitration process. The propulsion torque arbitration module 206 may still receive the engine shutoff request so that, for example, appropriate data can be fed back to other torque requestors. For example, all other torque requestors may be informed that they have lost arbitration.

The reserves/loads module 220 receives the arbitrated predicted and immediate torque requests 261 and 262. The reserves/loads module 220 may adjust the arbitrated predicted and immediate torque requests 261 and 262 to create a torque reserve and/or to compensate for one or more loads. The reserves/loads module 220 then outputs adjusted predicted and immediate torque requests 263 and 264 to the torque requesting module 224.

For example only, a catalyst light-off process or a cold start emissions reduction process may require retarded spark timing. The reserves/loads module 220 may therefore increase the adjusted predicted torque request 263 above the adjusted immediate torque request 264 to create retarded spark for the cold start emissions reduction process. In another example, the air/fuel ratio of the engine and/or the mass air flow may be directly varied, such as by diagnostic intrusive equivalence ratio testing and/or new engine purging. Before beginning these processes, a torque reserve may be created or increased to quickly offset decreases in engine output torque that result from leaning the air/fuel mixture during these processes.

The reserves/loads module 220 may also create or increase a torque reserve in anticipation of a future load, such as power steering pump operation or engagement of an air conditioning (A/C) compressor clutch. The reserve for engagement of the A/C compressor clutch may be created when the driver first requests air conditioning. The reserves/loads module 220 may increase the adjusted predicted torque request 263 while leaving the adjusted immediate torque request 264 unchanged to produce the torque reserve. Then, when the A/C compressor clutch engages, the reserves/loads module 220 may increase the adjusted immediate torque request 264 by the estimated load of the A/C compressor clutch.

The torque requesting module 224 receives the adjusted predicted and immediate torque requests 263 and 264. The torque requesting module 224 determines how the adjusted predicted and immediate torque requests 263 and 264 will be achieved. The torque requesting module 224 may be engine type specific. For example, the torque requesting module 224 may be implemented differently or use different control schemes for spark-ignition engines versus compression-ignition engines.

In various implementations, the torque requesting module 224 may define a boundary between modules that are common across all engine types and modules that are engine type specific. For example, engine types may include spark-ignition and compression-ignition. Modules prior to the torque requesting module 224, such as the propulsion torque arbitration module 206, may be common across engine types, while the torque requesting module 224 and subsequent modules may be engine type specific.

The torque requesting module 224 determines an air torque request 265 based on the adjusted predicted and immediate torque requests 263 and 264. The air torque request 265 may be a brake torque. Brake torque may refer to torque at the crankshaft under the current operating conditions.

Target values for airflow controlling engine actuators are determined based on the air torque request 265. More specifically, based on the air torque request 265, the air control module 228 determines a target wastegate opening area 266, a target throttle opening area 267, a target EGR opening area 268, a target intake cam phaser angle 269, and a target exhaust cam phaser angle 270. The air control module 228 determines the target wastegate opening area 266, the target throttle opening area 267, the target EGR opening area 268, the target intake cam phaser angle 269, and the target exhaust cam phaser angle 270 using model predictive control, as discussed further below.

The boost actuator module 164 controls the wastegate 162 to achieve the target wastegate opening area 266. For example, a first conversion module 272 may convert the target wastegate opening area 266 into a target duty cycle 274 to be applied to the wastegate 162, and the boost actuator module 164 may apply a signal to the wastegate 162 based on the target duty cycle 274. In various implementations, the first conversion module 272 may convert the target wastegate opening area 266 into a target wastegate position (not shown), and convert the target wastegate position into the target duty cycle 274.

The throttle actuator module 116 controls the throttle valve 112 to achieve the target throttle opening area 267. For example, a second conversion module 276 may convert the target throttle opening area 267 into a target duty cycle 278 to be applied to the throttle valve 112, and the throttle actuator module 116 may apply a signal to the throttle valve 112 based on the target duty cycle 278. In various implementations, the second conversion module 276 may convert the target throttle opening area 267 into a target throttle position (not shown), and convert the target throttle position into the target duty cycle 278.

The EGR actuator module 172 controls the EGR valve 170 to achieve the target EGR opening area 268. For example, a third conversion module 280 may convert the target EGR opening area 268 into a target duty cycle 282 to be applied to the EGR valve 170, and the EGR actuator module 172 may apply a signal to the EGR valve 170 based on the target duty cycle 282. In various implementations, the third conversion module 280 may convert the target EGR opening area 268 into a target EGR position (not shown), and convert the target EGR position into the target duty cycle 282.

The phaser actuator module 158 controls the intake cam phaser 148 to achieve the target intake cam phaser angle 269. The phaser actuator module 158 also controls the exhaust cam phaser 150 to achieve the target exhaust cam phaser angle 270. In various implementations, a fourth conversion module (not shown) may be included and may convert the target intake and exhaust cam phaser angles into target intake and exhaust duty cycles, respectively. The phaser actuator module 158 may apply the target intake and exhaust duty cycles to the intake and exhaust cam phasers 148 and 150, respectively. In various implementations, the air control module 228 may determine a target overlap factor and a target effective displacement, and the phaser actuator module 158 may control the intake and exhaust cam phasers 148 and 150 to achieve the target overlap factor and the target effective displacement.

The torque requesting module 224 may also generate a spark torque request 283, a torque capacity request 284, and a fuel torque request 285 based on the predicted and immediate torque requests 263 and 264. The spark control module 232 may determine how much to retard the spark timing (which reduces engine output torque) from an optimum spark timing based on the spark torque request 283. For example only, a torque relationship may be inverted to solve for a target spark timing 286. For a given torque request ($T_{Req}$), the target spark timing ($S_T$) 286 may be determined based on:

$$S_T = f^{-1}(T_{Req}, APC, I, E, AF, OT, \#), \quad (1)$$

where APC is air per cylinder, I is an intake valve phasing value, E is an exhaust valve phasing value, AF is an air/fuel ratio, OT is an oil temperature, and # is a number of activated cylinders. This relationship may be embodied as an equation and/or as a lookup table. The air/fuel ratio (AF) may be the actual air/fuel ratio, as reported by the fuel control module 240.

When the spark timing is set to the optimum spark timing, the resulting torque may be as close to a maximum best torque (MBT) as possible. MBT refers to the maximum engine output torque that is generated for a given air flow as spark timing is advanced, while using fuel having an octane rating greater than a predetermined octane rating and using stoichiometric fueling. The spark timing at which this maximum torque occurs is referred to as an MBT spark timing. The optimum spark timing may differ slightly from MBT spark timing because of, for example, fuel quality (such as when lower octane fuel is used) and environmental factors, such as ambient humidity and temperature. The engine output torque at the optimum spark timing may therefore be less than MBT. For example only, a table of optimum spark timings corresponding to different engine operating conditions may be determined during a calibration phase of vehicle design, and the optimum value is determined from the table based on current engine operating conditions.

The capacity control module 236 may determine a target torque capacity 287 based on the torque capacity request 284. In one example, the target torque capacity 287 may indicate a target number of cylinders to deactivate. In various implementations, a target number of cylinders to activate may be used. The capacity actuator module 120 may selectively activate and deactivate the valves of cylinders based on the target number. The capacity control module 236 may also instruct the fuel control module 240 to stop providing fuel for deactivated cylinders and may instruct the spark control module 232 to stop providing spark for deactivated cylinders. The spark control module 232 may stop providing spark to a cylinder once an air/fuel mixture that is already present in the cylinder has been combusted.

In another example, the target torque capacity 287 may indicate a target valve lift. The capacity actuator module 120 may adjust the lift of the intake valve 122 and/or the exhaust valve 130 based on the target valve lift. In various implementations, the capacity actuator module 120 may, based on the target valve lift, switch between lifting the intake and exhaust valves 122, 130 by a first amount and lifting the intake and exhaust valves 122, 130 by a second amount. The first and second amounts may be predetermined, and the second amount may be less than the first amount. The first amount and the second amount may be referred to as high lift and low lift, respectively.

The capacity control module 236 may switch the target torque capacity 287 between full capacity and a reduced capacity. For example, if the target torque capacity 287 indicates the target number of cylinders to activate, the capacity control module 236 may switch the target torque capacity 287 between activating all cylinders of the engine 102 and activating half of the cylinders. In another example, if the target torque capacity 287 indicates the target valve lift, the capacity control module 236 may switch the target torque capacity 287 between high lift and low lift. In various implementations, the capacity control module 236 may adjust the target torque capacity 287 to various levels of reduced capacity (e.g., various amounts of valve lift).

The fuel control module 240 may vary the amount of fuel provided to each cylinder based on the fuel torque request 285. More specifically, the fuel control module 240 may generate target fueling parameters 288 based on the fuel torque request 285. The target fueling parameters 288 may include, for example, target mass of fuel, target injection starting timing, and target number of fuel injections.

During normal operation, the fuel control module 240 may operate in an air lead mode in which the fuel control module 240 attempts to maintain a stoichiometric air/fuel ratio by controlling fueling based on air flow. For example, the fuel control module 240 may determine a target fuel mass that will yield stoichiometric combustion when combined with a present mass of air per cylinder (APC).

Figure 3:
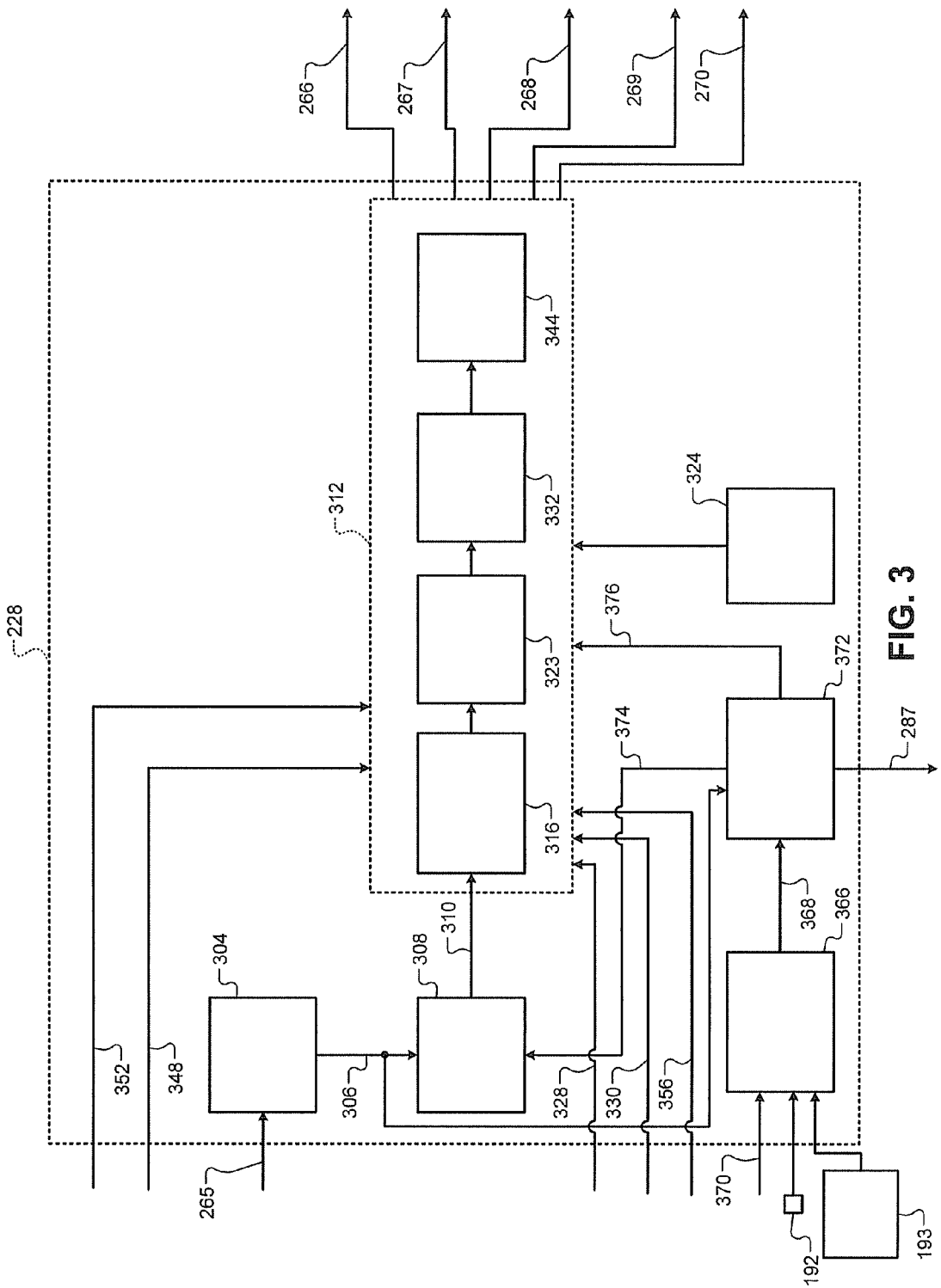
FIGS. 3 and 4 are functional block diagrams of example air control modules according to the present disclosure.

FIG. 3 is a functional block diagram of an example implementation of the air control module 228. Referring now to FIGS. 2 and 3, as discussed above, the air torque request 265 may be a brake torque. A torque conversion module 304 converts the air torque request 265 from brake torque into base torque. The torque request resulting from conversion into base torque is referred to herein as a base air torque request 306.

Base torques may refer to torque at the crankshaft made during operation of the engine 102 on a dynamometer while the engine 102 is warm and no torque loads are imposed on the engine 102 by accessories, such as an alternator and the A/C compressor. The torque conversion module 304 may convert the air torque request 265 into the base air torque request 306, for example, using a mapping or a function that relates brake torques to base torques.

An anticipated torque request module 308 generates anticipated torque requests for the N control loops. The anticipated torque requests may be referred to collectively as an anticipated torque trajectory. The anticipated torque request module 308 may determine the anticipated torque trajectory based on a desired torque capacity of the engine 102, as discussed in more detail below. The anticipated torque request module 308 outputs base air torque requests 310, which include the base air torque request 306 for the current control loop and the anticipated torque requests for the N control loops.

An MPC module 312 generates the target values 266-270 using a MPC (Model Predictive Control) scheme. The MPC module 312 may be a single module or may comprise multiple modules. For example, the MPC module 312 may include a sequence determination module 316. The sequence determination module 316 determines possible sequences of the target values 266-270 that could be used together during N future control loops.

A prediction module 323 determines predicted responses of the engine 102 to the possible sequences of the target values 266-270, respectively, based on a (mathematical) model 324 of the engine 102, exogenous inputs 328, and feedback inputs 330. More specifically, based on a possible sequence of the target values 266-270, the exogenous inputs 328, and the feedback inputs 330, using the model 324, the prediction module 323 generates a sequence of predicted torques of the engine 102 for the N control loops, a sequence of predicted APCs for the N control loops, a sequence of predicted amounts of external dilution for the N control loops, a sequence of predicted amounts of residual dilution for the N control loops, a sequence of predicted combustion phasing values for the N control loops, and a sequence of predicted combustion quality values for the N control loops.

The model 324 may be, for example, a function or a mapping calibrated based on characteristics of the engine 102. The relationship between the responses of the engine 102, the target values 266-270, the exogenous inputs 328, and the feedback inputs 330 may be nonlinear over the entire range of possible engine speeds and engine loads. However, the model 324 may include a plurality of linear models that each correspond to an engine speed and load range. The prediction module 323 may select one of the models based on the current engine speed and load, and use the selected model to predict the responses of the engine 102. For example, a first model may be used in an engine speed range from 1000 revolutions per minute (RPM) to 2000 RPM and an engine load range from 100 Newton-meters (Nm) to 150 Nm. A second model may be used in an engine speed range from 1000 RPM to 2000 RPM and an engine load range from 150 Nm to 200 Nm. A third model may be used in an engine speed range from 2000 RPM to 3000 RPM and an engine load range from 100 Nm to 150 Nm.

Dilution may refer to an amount of exhaust from a prior combustion event trapped within a cylinder for a combustion event. External dilution may refer to exhaust provided for a combustion event via the EGR valve 170. Residual dilution (also referred to as internal dilution) may refer to exhaust that remains in a cylinder and/or exhaust that is pushed back into the cylinder following the exhaust stroke of a combustion cycle.

Combustion phasing may refer to a crankshaft position where a predetermined amount of fuel injected is combusted within a cylinder relative to a predetermined crankshaft position for combustion of the predetermined amount of injected fuel. For example, combustion phasing may be expressed in terms of CA50 relative to a predetermined CA50. CA50 may refer to a crankshaft angle (CA) where 50 percent of a mass of injected fuel has been combusted within a cylinder. The predetermined CA50 may correspond to a CA50 where a maximum amount of work is produced from the fuel injected and may be approximately 8.5—approximately 10 degrees after TDC (top dead center) in various implementations. While combustion phasing will be discussed in terms of CA50 values, another suitable parameter indicative of combustion phasing may be used. Additionally, while combustion quality will be discussed as coefficient of variation (COV) of indicated mean effective pressure (IMEP) values, another suitable parameter indicative of combustion quality may be used.

The exogenous inputs 328 may include parameters that are not directly affected by the throttle valve 112, the EGR valve 170, the turbocharger, the intake cam phaser 148, and the exhaust cam phaser 150. For example, the exogenous inputs 328 may include engine speed, turbocharger inlet air pressure, IAT, and/or one or more other parameters. The feedback inputs 330 may include, for example, an estimated torque output of the engine 102, an exhaust pressure downstream of the turbine 160-1 of the turbocharger, the IAT, an APC of the engine 102, an estimated residual dilution, an estimated external dilution, and/or one or more other suitable parameters. The feedback inputs 330 may be measured using sensors (e.g., the IAT) and/or estimated based on one or more other parameters.

Each of the possible sequences identified by the sequence determination module 316 includes one sequence of N values for each of the target values 266-270. In other words, each possible sequence includes a sequence of N values for the target wastegate opening area 266, a sequence of N values for the target throttle opening area 267, a sequence of N values for the target EGR opening area 268, a sequence of N values for the target intake cam phaser angle 269, and a sequence of N values for the target exhaust cam phaser angle 270. Each of the N values are for a corresponding one of the N future control loops. N is an integer greater than or equal to one.

A cost module 332 determines a cost value for each of the possible sequences of the target values 266-270 based on the predicted parameters determined for a possible sequence. An example cost determination is discussed further below.

A selection module 344 selects one of the possible sequences of the target values 266-270 based on the costs of the possible sequences, respectively. For example, the selection module 344 may select the one of the possible sequences having the lowest cost while satisfying actuator constraints 348 and output constraints 352.

In various implementations, satisfaction of the actuator constraints 348 and the output constraints 352 may be considered in the cost determination. In other words, the cost module 332 may determine the cost values further based on the actuator constraints 348 and the output constraints 352. In various implementations, the cost module 332 may determine the cost values based on reference values 356 for each of the target values 266-270. As discussed further below, based on how the cost values are determined, the selection module 344 will select the one of the possible sequences that best achieves the base air torque request 306 while minimizing the APC, subject to the actuator constraints 348 and the output constraints 352.

The selection module 344 may set the target values 266-270 to the respective first ones of the N values of the selected sequence. In other words, the selection module 344 may set the target wastegate opening area 266 to the first one of the N values in the sequence of N values for the target wastegate opening area 266, set the target throttle opening area 267 to the first one of the N values in the sequence of N values for the target throttle opening area 267, set the target EGR opening area 268 to the first one of the N values in the sequence of N values for the target EGR opening area 268, set the target intake cam phaser angle 269 to the first one of the N values in the sequence of N values for the target intake cam phaser angle 269, and set the target exhaust cam phaser angle 270 to the first one of the N values in the sequence of N values for the target exhaust cam phaser angle 270.

During a next control loop, the MPC module 312 identifies possible sequences, generates the predicted parameters for the possible sequences, determines the cost of each of the possible sequences, selects of one of the possible sequences, and sets of the target values 266-270 to the first set of the target values 266-270 in the selected sequence. This process continues for each control loop.

An actuator constraint module 360 (see FIG. 2) sets one of the actuator constraints 348 for each of the target values 266-270. In other words, the actuator constraint module 360 sets an actuator constraint for the throttle valve 112, an actuator constraint for the EGR valve 170, an actuator constraint for the wastegate 162, an actuator constraint for the intake cam phaser 148, and an actuator constraint for the exhaust cam phaser 150.

The actuator constraints 348 for each one of the target values 266-270 may include a maximum value for an associated target value and a minimum value for that target value. The actuator constraint module 360 may generally set the actuator constraints 348 to predetermined operational ranges for the associated actuators. More specifically, the actuator constraint module 360 may generally set the actuator constraints 348 to predetermined operational ranges for the throttle valve 112, the EGR valve 170, the wastegate 162, the intake cam phaser 148, and the exhaust cam phaser 150, respectively.

However, the actuator constraint module 360 may selectively adjust one or more of the actuator constraints 348 under some circumstances. For example, the actuator constraint module 360 may adjust the actuator constraints for a given actuator to narrow the operational range for that engine actuator when a fault is diagnosed in that engine actuator. For another example only, the actuator constraint module 360 may adjust the actuator constraints such that the target value for a given actuator follows a predetermined schedule over time or changes by a predetermined amount, for example, for a fault diagnostic, such as a cam phaser fault diagnostic, a throttle diagnostic, an EGR diagnostic, etc. For a target value to follow a predetermined schedule over time or to change by a predetermined amount, the actuator constraint module 360 may set the minimum and maximum values to the same value. The minimum and maximum values being set to the same value may force the corresponding target value to be set to the same value as the minimum and maximum values. The actuator constraint module 360 may vary the same value to which the minimum and maximum values are set over time to cause the target value to follow a predetermined schedule.

An output constraint module 362 (see FIG. 2) sets the output constraints 352 for the predicted torque output of the engine 102, the predicted CA50, the predicted COV of IMEP, the predicted residual dilution, and the predicted external dilution. The output constraints 352 for each one of the predicted values may include a maximum value for an associated predicted parameter and a minimum value for that predicted parameter. For example, the output constraints 352 may include a minimum torque, a maximum torque, a minimum CA50 and a maximum CA50, a minimum COV of IMEP and a maximum COV of IMEP, a minimum residual dilution and a maximum residual dilution, and a minimum external dilution and a maximum external dilution.

The output constraint module 362 may generally set the output constraints 352 to predetermined ranges for the associated predicted parameters, respectively. However, the output constraint module 362 may vary one or more of the output constraints 352 under some circumstances. For example, the output constraint module 362 may retard the maximum CA50, such as when knock occurs within the engine 102. For another example, the output constraint module 362 may increase the maximum COV of IMEP under low load conditions, such as during engine idling where a higher COV of IMEP may be needed to achieve a given torque request.

A reference module 364 (see FIG. 2) generates the reference values 356 for the target values 266-270. The reference values 356 include a reference for each of the target values 266-270. In other words, the reference values 356 include a reference wastegate opening area, a reference throttle opening area, a reference EGR opening area, a reference intake cam phaser angle, and a reference exhaust cam phaser angle.

The reference module 364 may determine the reference values 356, for example, based on the air torque request 265, the base air torque request 306, and/or one or more other suitable parameters. The reference values 356 provide references for setting the target values 266-270, respectively. The reference values 356 may be used to determine the cost values for possible sequences. The reference values 356 may also be used for one or more other reasons, such as by the sequence determination module 316 to determine possible sequences.

Instead of or in addition to generating sequences of possible target values and determining the cost of each of the sequences, the MPC module 312 may identify a sequence of possible target values having the lowest cost using convex optimization techniques. For example, the MPC module 312 may determine the target values 266-270 using a quadratic programming (QP) solver, such as a Dantzig QP solver. In another example, the MPC module 312 may generate a surface of cost values for the possible sequences of the target values 266-270 and, based on the slope of the cost surface, identify a set of possible target values having the lowest cost. The MPC module 312 may then test that set of possible target values to determine whether that set of possible target values will satisfy the actuator constraints 348 and the output constraints 352. The MPC module 312 selects the set of possible target values having the lowest cost while satisfying the actuator constraints 348 and the output constraints 352.

The cost module 332 may determine the cost for the possible sequences of the target values 266-270 based on relationships between: the predicted torque and the base air torque request 306; the predicted APC and zero; the possible target values and the respective actuator constraints 348; the other predicted parameters and the respective output constraints 352; and the possible target values and the respective reference values 356. The relationships may be weighted, for example, to control the effect that each of the relationships has on the cost.

For example only, the cost module 332 may determine the cost for a possible sequence of the target values 266-270 based on the equation:

$$\text{Cost} = \sum_{i=1}^{N} \|wT*(TP_i - BATR_i)\|^2 + \left\|wTR*\left(\frac{TP_i}{APC_i} - K\right)\right\|^2,$$

where Cost is the cost for the possible sequence of the target values 266-270, TPi is the predicted torque of the engine 102 for an i-th one of the N control loops, BATRi is the i-th one of the base air torque requests 310 for the i-th one of the N control loops, and wT is a weighting value associated with the relationship between the predicted and reference engine torques. APCPi is a predicted APC for the i-th one of the N control loops and wTR is a weighting value associated with the relationship between the ratio of the predicted torque to the predicted APC and a constant K.

The cost module 332 may determine the cost for a possible sequence of the target values 266-270 based on the following more detailed equation:

$$\text{Cost} = \sum_{i=1}^{N} \rho \epsilon^2 + \|wT*(TP_i - BATR_i)\|^2 + \left\|wTR*\left(\frac{TP_i}{APC_i} - K\right)\right\|^2 +$$

$$\|wTV*(PTTOi - TORef)\|^2 + \|wWG*(PTWGOi - EGORef)\|^2 +$$

$$\|wEGR*(PTEGROi - EGRORef)\|^2 +$$

$$\|wIP*(PTICPi - ICPRef)\|^2 + \|wEP*(PTECPi - ECPRef)\|^2,$$

subject to the actuator constraints 348 and the output constraints 352. Cost is the cost for the possible sequence of the target values 266-270, TPi is the predicted torque of the engine 102 for an i-th one of the N control loops, BATRi is the i-th one of the base air torque requests 310 for the i-th one of the N control loops, and wT is a weighting value associated with the relationship between the predicted and reference engine torques. APCPi is a predicted APC for the i-th one of the N control loops and wTR is a weighting value associated with the relationship between the ratio of the predicted torque to the predicted APC and a constant K.

PTTOi is a possible target throttle opening for the i-th one of the N control loops, TORef is the reference throttle opening, and wTV is a weighting value associated with the relationship between the possible target throttle openings and the reference throttle opening. PTWGOi is a possible target wastegate opening for the i-th one of the N control loops, WGORef is the reference wastegate opening, and wWG is a weighting value associated with the relationship between the possible target wastegate openings and the reference wastegate opening.

PTEGROi is a possible target EGR opening for the i-th one of the N control loops, EGRRef is the reference EGR opening, and wEGR is a weighting value associated with the relationship between the possible target EGR openings and the reference EGR opening. PTICi is a possible target intake cam phaser angle for the i-th one of the N control loops, ICPRef is the reference intake cam phaser angle, and wIP is a weighting value associated with the relationship between the possible target intake cam phaser angle and the reference intake cam phaser angle. PTECi is a possible target exhaust cam phaser angle for the i-th one of the N control loops, ECPRef is the reference exhaust cam phaser angle, and wEP is a weighting value associated with the relationship between the possible target exhaust cam phaser angle and the reference exhaust cam phaser angle.

ρ is a weighting value associated with satisfaction of the output constraints 352. ε is a variable that the cost module 332 may set based on whether the output constraints 352 will be satisfied. For example, the cost module 332 may increase E when a predicted parameter is greater than or less than the corresponding minimum or maximum value (e.g., by at least a predetermined amount). The cost module 332 may set ε to zero when all of the output constraints 352 are satisfied. ρ may be greater than the weighting value wT, the weighting value wTR, and the other weighting values (wTV, wWG, wEGR, wIP, wEP) such that the cost determined for a possible sequence will be large if one or more of the output constraints 352 are not satisfied. This may help prevent selection of a possible sequence where one or more of the output constraints 352 are not satisfied.

The weighting value wT may be greater than the weighting value wTR and the weighting values wTV, wWG, wEGR, wIP, and wEP. In this manner, the relationship between the relationship between the predicted engine torque and the base air torque request 306 have a larger effect on the cost and, therefore, the selection of one of the possible sequences as discussed further below. The cost increases as the difference between the predicted engine torque and the base air torque request 306 increases and vice versa.

The weighting value wTR may be less than the weighting value wT and greater than the weighting values wTV, wWG, wEGR, wIP, and wEP. In this manner, the relationship between the ratio of the predicted torque to the predicted APC and the constant K has a large effect on the cost, but less than the relationship between the predicted engine torque and the base air torque request 306. The cost increases as the difference between the ratio of the predicted torque to the predicted APC and the constant K increases and vice versa. The constant K may be adjusted to a large value (e.g., ∞) such that the cost typically decreases as the ratio of the predicted torque to the predicted APC increases. In various implementations, a ratio of the predicted torque to a predicted fuel consumption of the engine 102 may be used in place of the ratio of the predicted torque to the predicted APC.

Determining the cost based on the ratio of the predicted torque to the predicted APC therefore helps ensure that the ratio of the torque output to the APC is maximized. Maximizing the ratio of the torque output to the APC decreases fuel consumption as fueling is controlled based on the actual APC to achieve a target air/fuel mixture. As the selection module 344 may select the one of the possible sequences having the lowest cost, the selection module 344 may select the one of the possible sequences that best achieves the base air torque request 306 while minimizing the fuel consumption.

The weighting values wTV, wWG, wEGR, wIP, and wEP may be less than all of the other weighting values. In this manner, during steady-state operation, the target values 266-270 may settle near or at the reference values 356, respectively. During transient operation, however, the MPC module 312 may adjust the target values 266-270 away from the reference values 356 in order to achieve the base air torque request 306, while minimizing the fuel consumption and satisfying the actuator constraints 348 and the output constraints 352.

In operation, the MPC module 312 may determine the cost values for the possible sequences. The MPC module 312 may then select the one of the possible sequences having the lowest cost. The MPC module 312 may next determine whether the selected sequence satisfies the actuator constraints 348. If so, the selected sequence may be used. If not, the MPC module 312 determines, based on the selected sequence, a possible sequence that satisfies the actuator constraints 348 and that has the lowest cost. The MPC module 312 may use the possible sequence that satisfies the actuator constraints 348 and that has the lowest cost.

A maximum torque module 366 estimates a maximum torque output 368 of the engine 102 when the engine 102 is operating at the reduced capacity. As discussed above, the engine 102 may operate at the reduced capacity when half of the cylinders of the engine 102 are deactivated or when the amount by which the intake and exhaust valves 122, 130 are lifted is adjusted to low lift. The maximum torque module 366 may estimate the maximum torque output 368 based on barometric pressure, an engine speed 370, the intake air temperature, and/or knock intensity.

The engine speed 370 may be determined based on the crankshaft position measured using the crankshaft position sensor 180. The intake air temperature may be received from the IAT sensor 192. The barometric pressure and the knock intensity may be received from the other sensors 193.

The maximum torque module 366 may estimate the maximum torque output 368 based on a maximum APC and the MBT spark timing using a predetermined relationship between APC, spark timing, and torque output. The predetermined relationship may be embodied in a lookup table and may be nonlinear. The maximum torque module 366 may determine the maximum APC based on the pressure within the intake manifold 110, the engine speed 370, and the intake air temperature. The maximum torque module 366 may determine the manifold pressure based on the barometric pressure or receive the manifold pressure from the MAP sensor 184.

The maximum torque module 366 may limit the maximum torque output 368 based on the amount of noise and vibration generated by the engine 102. The maximum torque module 366 may determine the current engine vibration based on the knock intensity. The maximum torque module 366 may estimate an expected engine vibration at a possible torque capacity that is different than the current torque capacity. The maximum torque module 366 may limit the maximum torque output 368 based on the current engine vibration and/or the expected engine vibration.

In various implementations, instead of the capacity control module 236 determining the target torque capacity 287, a desired capacity module 372 may determine the target torque capacity 287. The desired capacity module 372 may determine the target torque capacity 287 based on the base air torque request 306 and the maximum torque output 368. The desired capacity module 372 may determine a first torque threshold and a second torque threshold based on the maximum torque output 368. The desired capacity module 372 may switch the target torque capacity 287 from full capacity to the reduced capacity when the base air torque request 306 is less than the first torque threshold. The first torque threshold may be less than or equal to the maximum torque output 368. The desired capacity module 372 may switch the target torque capacity 287 from the reduced capacity to full capacity when the base air torque request 306 is greater than the second torque threshold. The second torque threshold may be greater than the first torque threshold to minimize switching between full capacity and the reduced capacity.

Additionally or alternatively, the desired capacity module 372 may apply a switching frequency limit. For example, when the number of torque capacity switches is equal to a predetermined number (e.g., 3) within a predetermined period (e.g., 3 minutes), the desired capacity module 372 may keep the target torque capacity 287 set to full torque capacity for a predetermined period.

The desired capacity module 372 may also determine a desired torque capacity 374 of the engine 102 at a future time. For example, before switching the target torque capacity 287 from full capacity to the reduced capacity, the desired capacity module 372 may switch the desired torque capacity 374 from full capacity to the reduced capacity. Similarly, before switching the target torque capacity 287 from the reduced capacity to full capacity, the desired capacity module 372 may switch the desired torque capacity 374 from the reduced capacity to full capacity.

When the torque capacity of the engine 102 is switched from full capacity to the reduced capacity, the APC required to achieve a given torque output increases by nearly double since the displacement of the engine 102 decreases by half. The APC does not quite double due to an efficiency improvement. Thus, the total amount of intake airflow required to achieve the torque output decreases slightly. Since the required amount of intake airflow decreases only slightly while the APC increases by nearly double, the pressure in the intake manifold 110 required to achieve the torque output increases. However, due to the amount of time required to increase the manifold pressure, the torque output of the engine 102 may decrease when the torque capacity of the engine 102 is initially switched from full capacity to the reduced capacity.

To avoid the time lag associated with increasing the manifold pressure, the anticipated torque request module 308 may determine the anticipated torque trajectory based on the desired torque capacity 374. When the desired torque capacity 374 decreases, the anticipated torque request module 308 may adjust the anticipated torque trajectory to reflect an anticipated torque increase. In turn, the MPC module 312 may adjust the target values 266-270 to satisfy the current base air torque request 306 and to satisfy the anticipated torque increase with minimal lag. For example, the MPC module 312 may increase the target throttle opening area 267 to increase the manifold pressure in response to the anticipated torque increase. In addition, the MPC module 312 may adjust the target intake and exhaust cam phaser angles 269 and 270 to decrease the volumetric efficiency of the engine 102 and thereby avoid overshooting the base air torque request 306. Then, when the torque capacity of the engine 102 is actually switched from full capacity to the reduced capacity, the MPC module 312 may adjust the target intake and exhaust cam phaser angles 269 and 270 to quickly achieve the desired torque output. The amount of torque that the engine 102 can produce on short notice by adjusting the target intake and exhaust cam phaser angles 269 and 270 may be referred to as an airflow reserve.

The volumetric efficiency of the engine 102 is a ratio (or percentage) of the actual quantity of air that enters cylinders of the engine 102 during induction to the potential (or geometric) capacity of the cylinders under static conditions. The MPC module 312 may decrease the volumetric efficiency of the engine 102 by adjusting the target intake and exhaust cam phaser angles 269 and 270 to create internal dilution or to decrease the effective displacement of the engine 102. The effective displacement of the engine 102 is the volume of air drawn into cylinders of the engine 102 as pistons in the cylinders travel from TDC to BDC, minus losses in air volume due to, for example, air flowing back through the intake valve 122. The MPC module 312 may determine whether to decrease the volumetric efficiency of the engine 102 by creating internal dilution or decreasing the effective displacement of the engine 102 by selecting the option that yields the lowest cost.

The MPC module 312 may create internal dilution by advancing the target intake cam phaser angle 269 and retarding the exhaust cam phaser angle 270 to draw exhaust gas into the intake manifold 110. This reduces the amount of air and unburned fuel present in the cylinders, which reduces the volumetric efficiency of the engine 102. The MPC module 312 may reduce the effective displacement of the engine 102 by retarding the target intake cam phaser angle 269 to force air from the cylinders back into the intake manifold 110 during the respective compression strokes of the cylinders.

The MPC module 312 may adjust the target values 266-270 in ways other than those described above to satisfy the current base air torque request 306 and to satisfy the anticipated torque increase with minimal lag. For example, the MPC module 312 may decrease the target wastegate opening area 266 to increase the manifold pressure in response to the anticipated torque increase. In addition, the MPC module 312 may decrease the target throttle opening area 267 avoid overshooting the base air torque request 306 as the target wastegate opening area 266 is decreased. Then, when the torque capacity of the engine 102 is actually switched from full capacity to the reduced capacity, the MPC module 312 may adjust the target intake and exhaust cam phaser angles 269 and 270 to quickly achieve the desired torque output. The MPC module 312 may determine how to adjust the target values 266-270 to satisfy both the current base air torque request 306 and the anticipated torque increase by selecting the one of the possible sequences of the target values 266-270 that yields the lowest cost.

When the torque capacity of the engine 102 is switched from the reduced capacity to full capacity, the pressure in the intake manifold 110 required to achieve the torque output decreases. To avoid the time lag associated with decreasing the manifold pressure using the throttle valve 112, the anticipated torque request module 308 may determine the anticipated torque trajectory based on the desired torque capacity 374. When the desired torque capacity 374 decreases, the anticipated torque request module 308 may adjust the anticipated torque trajectory to reflect an anticipated torque decrease. In turn, the MPC module 312 may adjust the target values 266-270 to satisfy the base air torque request 306 and to satisfy the anticipated torque decrease with minimal lag. For example, the MPC module 312 may decrease the target throttle opening area 267 in response to the anticipated torque increase and adjust the target intake and exhaust cam phaser angles 269 and 270 to satisfy the base air torque request 306. Then, when the torque capacity of the engine 102 actually switches from the reduced capacity to full capacity, the MPC module 312 may adjust the target intake and exhaust cam phaser angles 269 and 270 to quickly achieve the desired torque output.

The MPC module 312 may adjust the target intake and exhaust cam phaser angles 269 and 270 to increase the volumetric efficiency of the engine 102 and thereby satisfy the base air torque request 306 as the target throttle opening area 267 is decreased. The MPC module 312 may increase the volumetric efficiency of the engine 102 by adjusting the target intake and exhaust cam phaser angles 269 and 270 to decrease internal dilution or to increase the effective displacement of the engine 102. The MPC module 312 may determine whether to increase the volumetric efficiency of the engine 102 by decreasing internal dilution or increasing the effective displacement of the engine 102 by selecting the option that yields the lowest cost.

The MPC module 312 may decrease internal dilution by retarding the target intake cam phaser angle 269 and advancing the exhaust cam phaser angle 270 to decrease the amount of exhaust gas drawn into the intake manifold 110. This increases the amount of air and unburned fuel present in the cylinders, which increases the volumetric efficiency of the engine 102. The MPC module 312 may increase the effective displacement of the engine 102 by advancing the target intake cam phaser angle 269 to avoid forcing air from the cylinders to the intake manifold 110 during their respective compression strokes.

The desired capacity module 372 may also determine a model torque capacity 376. As discussed above, the model 324 may include a plurality of linear models that each correspond to an engine speed and load range. In addition, for each engine speed and engine load range, the model 324 may include a full capacity model for full capacity and a reduced capacity model for the reduced capacity. The prediction module 323 may use the model torque capacity 376 to determine whether to use the full capacity model or the reduced capacity model when predicting the responses of the engine 102. In addition, the reference module 364 (FIG. 2) may determine the reference values 356 based on the model torque capacity 376.

The relationship between the torque output of the engine 102, the APC, and the target values 266-270 changes as the torque capacity of the engine 102 is switched between full capacity and the reduced capacity. For example, the APC may be set to 200 milligrams (mg) to achieve a certain torque output when all cylinders are active, while the APC may be set to 380 mg to achieve the same torque output when half of the cylinders are active. Thus, the amount of APC required to achieve a certain torque output may be nearly doubled when half of the cylinders are deactivated, but not be quite doubled due to an efficiency improvement. The throttle position required to achieve a given torque output also changes when half of the cylinders are deactivated since slightly less intake airflow is required. Further, since the amount of intake airflow decreases only slightly while the number of cylinders decreases by half, the manifold pressure increases. Thus, the relationship between the throttle position and the manifold pressure changes. The prediction module 323 accounts for these changing relationships by selecting the appropriate torque capacity model.

The desired capacity module 372 may switch the model torque capacity 376 after adjusting the desired torque capacity 374 and before or after switching the target torque capacity 287. In one example, the desired capacity module 372 may switch the desired torque capacity 374 P control loops before switching the target torque capacity 287. The desired capacity module 372 may then switch the model torque capacity 376 Q control loops before switching the target torque capacity 287, where Q is less than P.

The anticipated torque request module 308 may determine the anticipated torque trajectory with a prediction period of 500 milliseconds (ms) via 20 control loops. In other words, the period of each of the N control loops may be 25 milliseconds, and N may be equal to 20. In addition, the desired capacity module 372 may switch the desired torque capacity 374 at a time corresponding to 10 control loops or 250 ms before the desired torque capacity 374 switches the target torque capacity 287. Thus, in the example above, P may be equal to 10. The value of P may be predetermined to ensure that the MPC module 312 has enough time to adjust engine operation by switching the target values 266-270 to satisfy the base air torque request 306 and satisfy the anticipated torque increase with minimal lag. For example, there may be a lag or delay from the time when the MPC module 312 adjust the target wastegate opening area 266 to zero and the time when the manifold pressure (or boost) increases in response to the wastegate 162 closing. Switching the model torque capacity 376 before the manifold pressure increases may cause a torque hole. Thus, the desired torque capacity 374 may be switched a number of control loops before the model torque capacity 376 is switched to allow enough time for an airflow reserve to be created after the anticipated torque trajectory is adjusted to reflect an anticipated torque increase.

When the desired capacity module 372 switches the model torque capacity 376 from full capacity to the reduced capacity, the torque output of the engine 102 may increase due to an increase in a desired APC. The torque output of the engine 102 may then decrease when the torque capacity of the engine 102 actually switches from full capacity to the reduced capacity. Thus, the driver may initially feel a torque surge when the model torque capacity 376 is switched, followed by a torque hole when the torque capacity of the engine 102 actually switches from full capacity to reduced capacity. To avoid this undesired driver feel, the ECM 114 may instruct the transmission control module 194 to create torque converter slip during a switch.

The desired capacity module 372 may switch the model torque capacity 376 at a time corresponding to 1 control loop or 25 ms before the desired torque capacity 374 switches the target torque capacity 287. Thus, in the example above, Q may be equal to 1. The value of Q may be predetermined such that the period of the torque increase before the switch and the period of the torque decrease after the switch are equal. In turn, less torque converter slip may be used to improve driver feel during the switch.

There may be a delay from the time when the desired capacity module 372 switches the target torque capacity 287 to the time when the capacity control module 120 actually switches the torque capacity of the engine 102. For example, the intake and exhaust cam phasers 148 and 150 may be coupled to the intake and exhaust camshafts 140, 142 using pins (not shown), and the capacity control module 120 may not remove the pins to deactivate the cylinder 118 until there is no force on the pins. There may be no force on the pin when the intake and exhaust cam phasers 148 and 150 are not lifting the intake and exhaust valves 122 and 130, such as during a power stroke or a compression stroke. Thus, when the desired capacity module 372 switches the target torque capacity 287, the capacity control module 120 may not deactivate a cylinder of the engine 102 until a piston in the cylinder is completing a power stroke or a compression stroke. Therefore, during the period from the time when desired capacity module 372 switches the target torque capacity 287 to the time when the capacity control module 120 actually switches the torque capacity of the engine 102, the engine 102 may complete two engine cycles. Each engine cycle may correspond to two crankshaft revolutions.

The period of one engine cycle may be determined using a relationship such as $$Tec = 120000/RPM, \quad (3)$$

where Tec is the period of one engine cycle in ms and RPM is the engine speed in revolutions per minute. Thus, for example, if the engine speed is 1200 RPM, the period of each engine cycle may be 100 ms.

When determining when to switch the desired torque capacity 374 and/or when to switch the model torque capacity 376, the desired capacity module 372 may account for the lag from the time when the target torque capacity 287 is switched to the time when the actual torque capacity of the engine 102 is switched. Thus, if the period of two engine cycles is 200 ms and the period required to increase the manifold pressure in response to the anticipated torque increase is 300 ms, the desired capacity module 372 may switch the desired torque capacity 374 100 ms before switching the target torque capacity 287.

Figure 4:
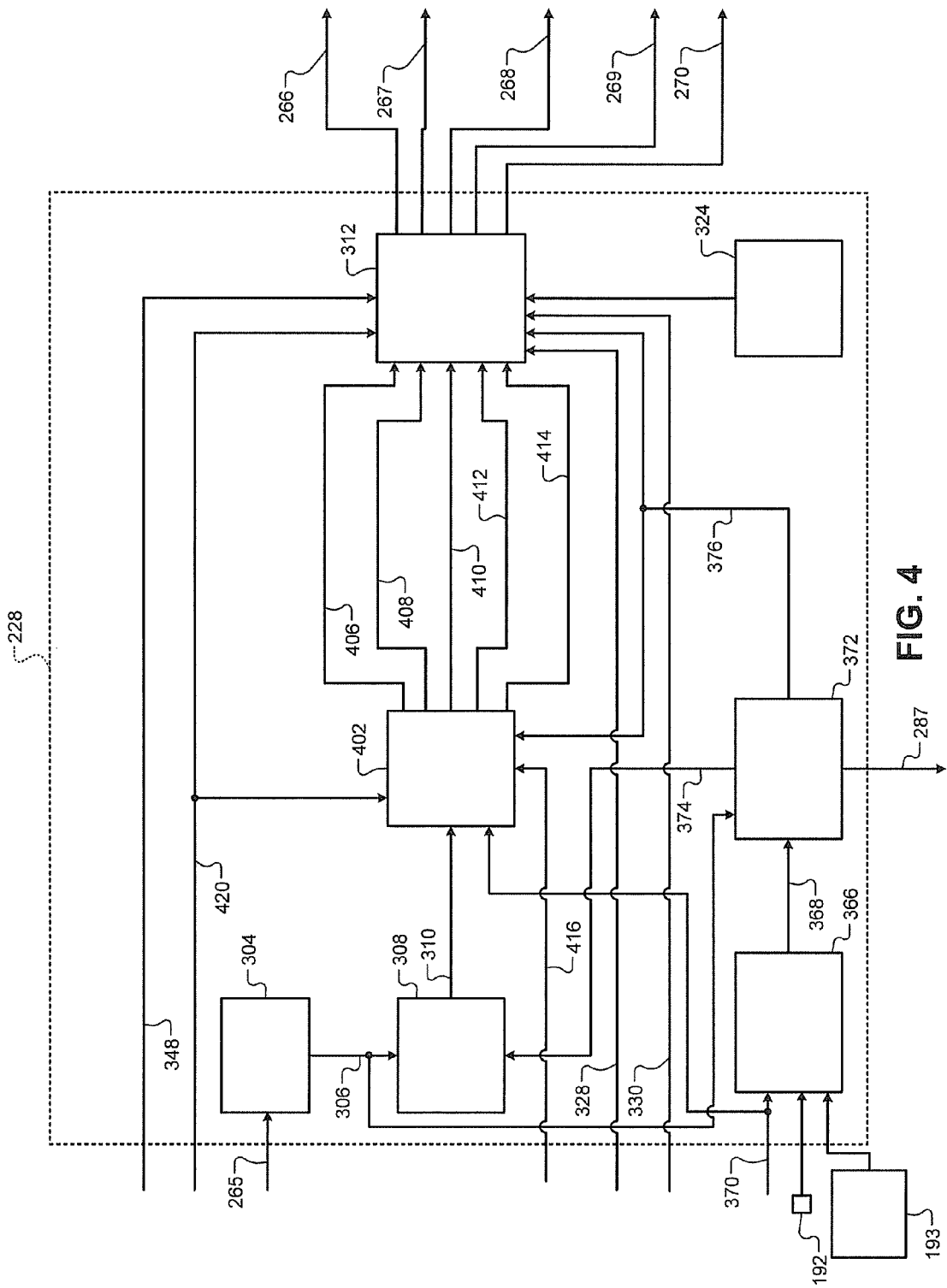

Referring now to FIGS. 2 and 4, in various implementations, the base air torque requests 310 may be sent to a setpoint module 402 instead of the MPC module 312. The setpoint module 402 generates setpoint values for controlling the throttle valve 112, the EGR valve 170, the wastegate 162, the intake cam phaser 148, and the exhaust cam phaser 150 to achieve the base air torque request 306 at the present engine speed 370. The setpoints may be referred to as engine air and exhaust setpoints. In various implementations, the torque conversion module 304 may convert the air torque request 265 into another type of torque that is suitable for use by the setpoint module 402, such as an indicated torque. An indicated torque may refer to a torque at the crankshaft attributable to work produced via combustion within the cylinders.

For example, the setpoint module 402 may generate a throttle inlet air pressure (TIAP) setpoint 406, a mass of air per cylinder (APC) setpoint 408, an external dilution setpoint 410, a residual dilution setpoint 412, and an effective displacement setpoint 414. The setpoint module 402 may generate the TIAP setpoint 406, the APC setpoint 408, the external dilution setpoint 410, the residual dilution setpoint 412, and the effective displacement setpoint 414 using one or more functions or mappings that relate the base air torque request 306 and the engine speed 370 to the setpoints. The setpoint module 402 may also generate future setpoints for the N control loops. Thus, each of the setpoints 406-414 may include future setpoints for the N control loops. As discussed above, the based air torque requests 310 may include the base air torque requests 306 and anticipated based air torque requests. The setpoint module 402 may generate the future setpoints using one or more functions or mappings that relate the anticipated torque requests and the engine speed 370 to the future setpoints.

The TIAP setpoint 406 may refer to a target pressure downstream from the compressor 160-2 and upstream from the throttle valve 112. The APC setpoint 408 may refer to a target mass of air to be drawn into a cylinder for a combustion event. The external dilution setpoint 410 may refer to a target amount of external dilution. The residual dilution setpoint 412 may refer to a target amount of residual dilution. The effective displacement setpoint 414 may refer to a target volume of air drawn into cylinders of the engine 102 as pistons in the cylinders travel from TDC to BDC minus losses in air volume due to, for example, air flowing back through the intake valve 122.

The setpoint module 402 may generate one or more of the setpoints 406-414 further based on desired combustion phasing 416 and the model torque capacity 376. When one or more cylinders are deactivated, each active cylinder is responsible for producing a greater amount of torque in order to achieve the base air torque request 306. The setpoint module 402 may therefore adjust one or more of the setpoints 406-414 based on the model torque capacity 376. For example, the setpoint module 402 may increase the APC setpoint 408 when the model torque capacity 376 is switched from full capacity to the reduced capacity.

A combustion phasing module 418 (FIG. 2) may generally set the desired combustion phasing 416 such that the CA50 occurs at the predetermined CA50. In other words, the combustion phasing module 418 may generally set the desired combustion phasing 416 such that zero combustion phasing occurs to achieve the maximum work and therefore a maximum fuel efficiency. However, the combustion phasing module 418 may selectively adjust the desired combustion phasing 416 under some circumstances.

For example, the combustion phasing module 418 may set the desired combustion phasing such that the CA50 occurs after the predetermined CA50 when knock is detected. Knock may be detected, for example, using one or more knock sensors. Additionally or alternatively, the combustion phasing module 418 may set the desired combustion phasing such that the CA50 occurs after the predetermined CA50 when one or more conditions are present that may cause knock to occur. For example, knock may occur when a quality of fuel within a fuel tank of the vehicle is less than a predetermined quality and/or the ambient temperature is greater than a predetermined temperature and ambient humidity is less than a predetermined value.

When combustion is retarded such that the CA50 occurs after the predetermined CA50, airflow into the cylinders should be increased to achieve the base air torque request 306. The setpoint module 402 may therefore adjust one or more of the setpoints 406-414 based on the desired combustion phasing 416. For example, the setpoint module 402 may increase the APC setpoint 408 when the desired combustion phasing 416 is retarded to provide a CA50 that is after the predetermined CA50.

The setpoint module 402 also generates the setpoints 406-414 based on one or more setpoint constraints 420. A setpoint constraint module 422 may set the setpoint constraints 420 for the setpoints 406-414 to predetermined acceptable ranges, respectively. The setpoint module 402 sets the setpoints 406-414 to remain within the setpoint constraints 420, respectively.

However, the setpoint constraint module 422 may selectively adjust a setpoint constraint under some circumstances. For example only, the setpoint constraint module 422 may set a setpoint constraint to disable dilution. The setpoint module 402 may limit the external dilution setpoint 410 and the residual dilution setpoint 412 to zero in response the setpoint constraint to disable dilution.

The setpoint module 402 may also adjust one or more of the other setpoints based on the limitation of a setpoint. For example, the setpoint module 402 may increase the APC setpoint 408 in order to achieve the base air torque request 306 when the external and residual dilution setpoints 410 and 412 are limited.

The MPC module 312 determines a cost (value) for each of the possible sequences of the target values 266-270 based on relationships between the setpoints 406-414 and the predictions, respectively. For example, the MPC module 312 may determine the cost for each of the possible sequences of the target values 266-270 based on the periods for the predicted parameters to reach the setpoints 406-414, respectively, and/or amounts that the predicted parameters overshoot the setpoints 406-414, respectively. For example only, the cost may increase as the period for a predicted parameter to reach a setpoint increases and/or as the amount that the predicted parameter overshoots the setpoint increases. In various implementations, satisfaction of the actuator constraints 348 and the setpoint constraints 420 may be considered in the cost determination. In other words, the cost module 332 may determine the cost values further based on the actuator constraints 348 and the setpoint constraints 420.

Each pair of predicted parameters and setpoints may be weighted to affect how much the relationships between the predicted parameters and the setpoints affects the cost. For example, the relationship between the predicted APC and the APC setpoint 408 maybe weighted to affect the cost more than the relationship between another predicted parameter and the corresponding setpoint.

In FIG. 3, the MPC module 312 adjusts the target values 266-270 to satisfy the base air torque requests 310, which include the current base air torque request 306 and the anticipated torque requests. Thus, when the anticipated torque trajectory indicates an anticipated torque increase, the MPC module 312 may adjust the target throttle opening area 267 in response to the anticipated torque increase. In addition, the MPC module 312 may adjust the target intake and exhaust cam phaser angles 269 and 270 to avoid overshooting the base air torque request 306 when the target throttle area opening 267 is increased. For example, the MPC module 312 may adjust the target intake and exhaust cam phaser angles 269 and 270 to decrease the volumetric efficiency of the engine 102 by creating internal dilution or decreasing the effective displacement of the engine 102.

In contrast, in FIG. 4, the setpoint module 402 adjusts the setpoints 406-414 based on the base air torque requests 310, and the MPC module 312 adjusts the target values 266-270 based on the setpoints 406-414. Thus, when the anticipated torque trajectory indicates an anticipated torque increase, the setpoint module 402 may adjust one or more of the setpoints 406-414 to decrease the volumetric efficiency of the engine 102 and thereby create an airflow reserve. For example, the setpoint module 402 may decrease the volumetric efficiency of the engine 102 by increasing the residual dilution setpoint 412 or decreasing the effective displacement setpoint 414. To satisfy the base air torque request 306 as the volumetric efficiency of the engine 102 is decreased, the MPC module 312 may increase the target throttle opening area 267 and/or increase the manifold pressure. As the airflow reserve is created, the setpoint module 402 may not change the APC setpoint 402 or may slightly decrease the APC setpoint 402. Then, when a torque increase is actually needed, the setpoint module 402 may increase the APC setpoint 402 and increase the volumetric efficiency of the engine 102. The setpoint module 402 may increase the volumetric efficiency of the engine 102 by decreasing the residual dilution setpoint 412 or increasing the effective displacement setpoint 414.

In FIG. 3, when the anticipated torque trajectory indicates an anticipated torque decrease, the MPC module 312 may increase the volumetric efficiency of the engine 102 by adjusting the target intake and exhaust cam phaser angles 269 and 270. In addition, the MPC module 312 may decrease the target throttle opening area 267 to avoid overshooting the base air torque request 306 as the volumetric efficiency of the engine 102 is increased. Then, when a torque decrease is actually needed, the MPC module 312 may decrease the volumetric efficiency of the engine 102 by adjusting the target intake and exhaust cam phaser angles 269 and 270.

In contrast, in FIG. 4, when the anticipated torque trajectory indicates an anticipated torque decrease, the setpoint module 402 may increase the volumetric efficiency of the engine 102 by decreasing the residual dilution setpoint 412 or increasing the effective displacement setpoint 414. In addition, to avoid overshooting the APC setpoint 408 as the volumetric efficiency of the engine 102 is increased, the MPC module 312 may decrease the target throttle area opening 267. Then, when a torque decrease is actually needed, the setpoint module 402 may decrease the volumetric efficiency of the engine 102 by increasing the residual dilution setpoint 412 or decreasing the effective displacement setpoint 414.

Figure 5:
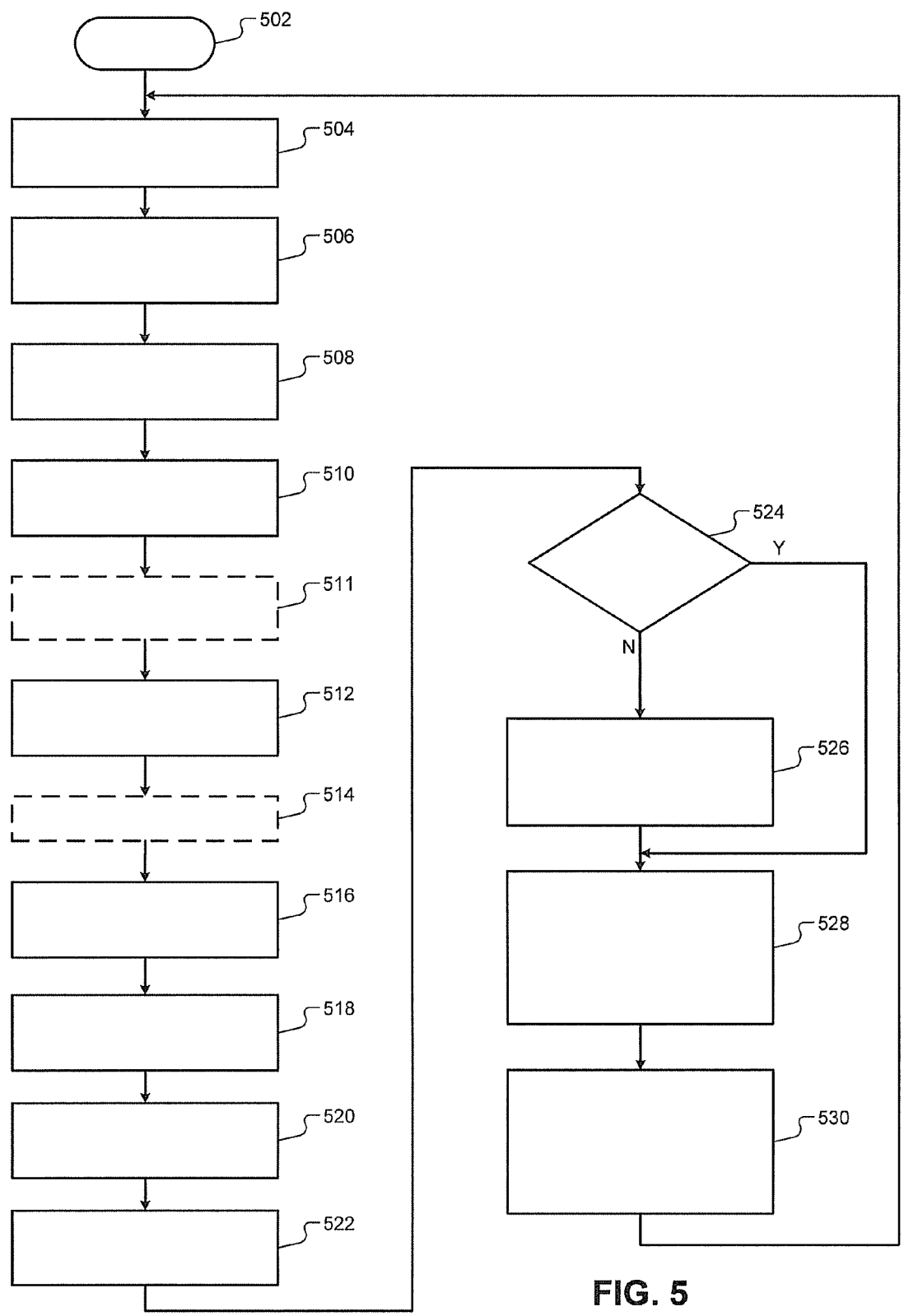
FIG. 5 is a flowchart illustrating an example method of controlling an engine using model predictive control according to the present disclosure.

Referring now to FIG. 5, a flowchart depicting an example method of controlling the throttle valve 112, the intake cam phaser 148, the exhaust cam phaser 150, the wastegate 162

(and therefore the turbocharger), and the EGR valve 170 using MPC (model predictive control) begins at 502. At 504, the torque requesting module 224 determines the air torque request 265 based on the adjusted predicted and immediate torque requests 263 and 264. At 506, the torque conversion module 304 converts the air torque request 265 into the base air torque request 306 or into another suitable type of torque for use by the MPC module 312 or the setpoint module 402.

At 508, the maximum torque module determines the maximum torque output of the engine 102 at the reduced capacity. At 510, the desired capacity module 372 determines the target torque capacity 287, the desired torque capacity 374, and the model torque capacity 376. In various implementations, at 511, the reference module 364 determines the reference values 356 based on the base air torque request and the model torque capacity 376. At 512, the anticipated torque request module 308 determines the anticipated torque requests based on the desired torque capacity 374. In various implementations, at 514, the setpoint module 402 generates the setpoints 406-414 based on the base air torque request and the anticipated torque requests.

At 516, the sequence determination module 316 determines possible sequences of the target values 266-270 based on the base air torque request 306. At 518, the prediction module 323 determines the predicted parameters for each of the possible sequences of target values. The prediction module 323 determines the predicted parameters for the possible sequences based on the model 324 of the engine 102, the exogenous inputs 328, and the feedback inputs 330. More specifically, based on a possible sequence of the target values 266-270, the exogenous inputs 328, and the feedback inputs 330, using the model 324, the prediction module 323 generates a sequence of predicted torques of the engine 102 for the N control loops, a sequence of predicted APCs for the N control loops, a sequence of predicted amounts of external dilution for the N control loops, a sequence of predicted amounts of residual dilution for the N control loops, a sequence of predicted combustion phasing values for the N control loops, and a sequence of predicted combustion quality values for the N control loops.

At 520, the cost module 332 determines the costs for the possible sequences, respectively. For example only, the cost module 332 may determine the cost for a possible sequence of the target values 266-270 based on the equation $$\text{Cost} = \sum_{i=1}^{N} \|wT*(TP_i - BATR_i)\|^2 + \left\|wTR\frac{T}{FC}*\left(\frac{TP_i}{FAPC_i} - K\right)\right\|^2,$$

or based on the equation $$\text{Cost} = \sum_{i=1}^{N} \rho\epsilon^2 + \|wT*(TP_i - BATR_i)\|^2 + \left\|wTR\frac{T}{FC}*\left(\frac{TP_i}{FAPC_i} - K\right)\right\|^2 +$$
$$wTV*(PTTOi - TORef)^2 + \|wWG*(PTWGOi - EGORef)\|^2 +$$
$$\|wEGR*(PTEGROi - EGRORef)\|^2 +$$
$$\|wIP*(PTICPi - ICPRef)\|^2 + \|wEP*(PTECPi - ECPRef)\|^2,$$

subject to the actuator constraints 348 and the output constraints 352, as discussed above.

At 522, the selection module 344 selects one of the possible sequences of the target values 266-270 based on the costs of the possible sequences, respectively. For example, the selection module 344 may select the one of the possible sequences having the lowest cost while satisfying the actuator constraints 348 and the output constraints 352. The selection module 344 may therefore select the one of the possible sequences that best achieves the base air torque request 306 while minimizing the APC and satisfying the output constraints 352. Instead of or in addition to determining possible sequences of the target values 230-244 at 516 and determining the cost of each of the sequences at 520, the MPC module 312 may identify a sequence of possible target values having the lowest cost using convex optimization techniques as discussed above.

At 524, the MPC module 312 may determine whether the selected one of the possible sequences satisfies the actuator constraints 348. If the selected sequence does not satisfy the actuator constraints 348, the method continues at 526. Otherwise, the method continues at 528. At 526, the MPC module 312 determines, based on the selected sequence, a possible sequence that satisfies the actuator constraints 348 and that has the lowest cost. The method then continues at 528.

At 528, the first conversion module 272 converts the target wastegate opening area 266 into the target duty cycle 274 to be applied to the wastegate 162, the second conversion module 276 converts the target throttle opening area 267 into the target duty cycle 278 to be applied to the throttle valve 112. The third conversion module 280 also converts the target EGR opening area 268 into the target duty cycle 282 to be applied to the EGR valve 170 at 428. The fourth conversion module may also convert the target intake and exhaust cam phaser angles 269 and 270 into the target intake and exhaust duty cycles to be applied to the intake and exhaust cam phasers 148 and 150, respectively.

At 530, the throttle actuator module 116 controls the throttle valve 112 to achieve the target throttle opening area 267, and the phaser actuator module 158 controls the intake and exhaust cam phasers 148 and 150 to achieve the target intake and exhaust cam phaser angles 269 and 270, respectively. For example, the throttle actuator module 116 may apply a signal to the throttle valve 112 at the target duty cycle 278 to achieve the target throttle opening area 267. Also at 530, the EGR actuator module 172 controls the EGR valve 170 to achieve the target EGR opening area 268, and the boost actuator module 164 controls the wastegate 162 to achieve the target wastegate opening area 266. For example, the EGR actuator module 172 may apply a signal to the EGR valve 170 at the target duty cycle 282 to achieve the target EGR opening area 268, and the boost actuator module 164 may apply a signal to the wastegate 162 at the target duty cycle 274 to achieve the target wastegate opening area 266. The method may then return to 504. In this regard, FIG. 5 may be illustrative of one control loop, and control loops may be executed at a predetermined rate.

Figure 6:
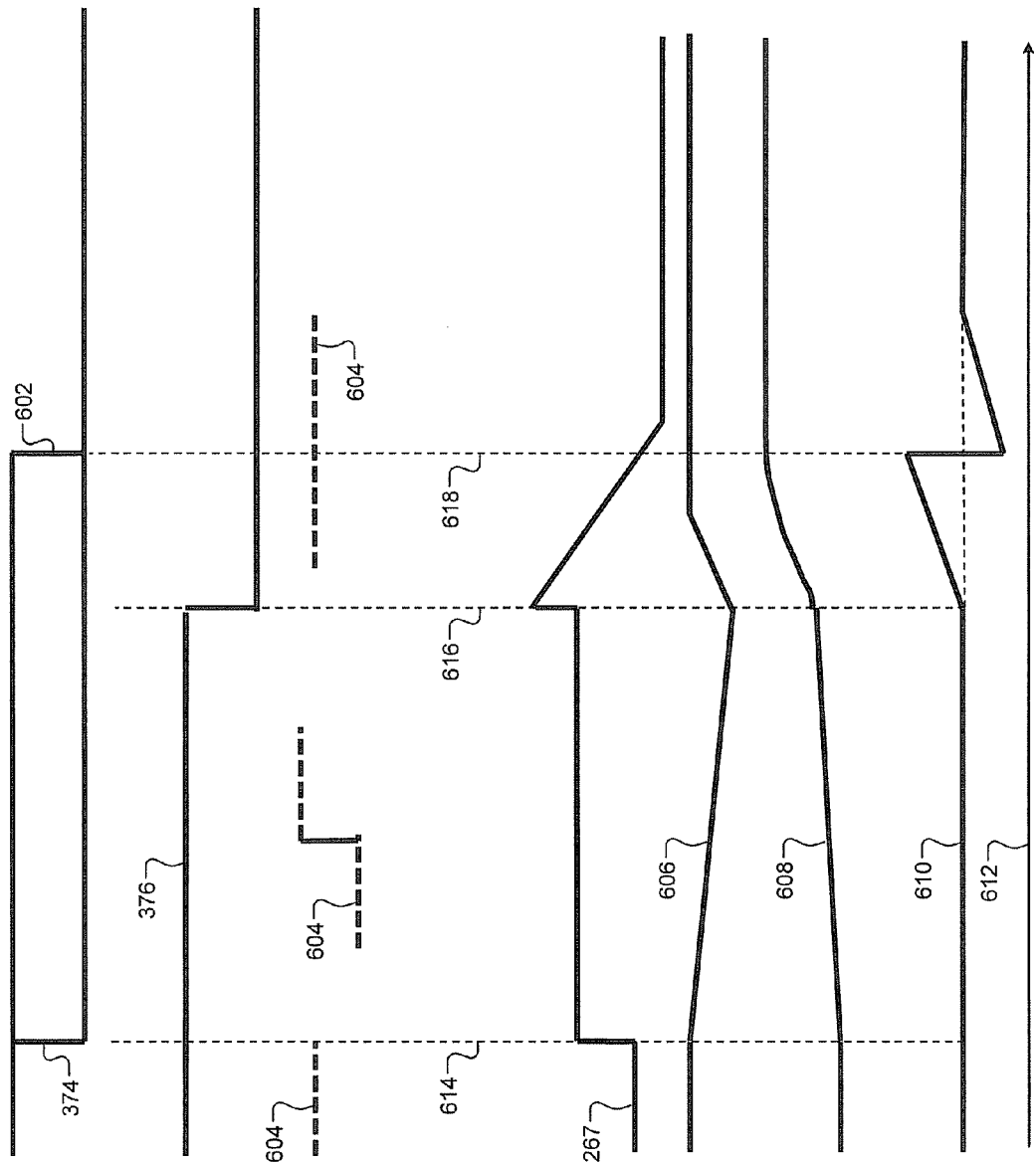
FIGS. 6 and 7 are graphs illustrating example signals for controlling an engine using model predictive control according to the present disclosure.

Referring now to FIG. 6, a graph illustrates actual and desired operating conditions of the engine 102 as the torque capacity of the engine 102 is switched from full capacity to a reduced capacity using MPC (model predictive control). The operating conditions include the desired torque capacity 374, an actual torque capacity 602 of the engine 102, the model torque capacity 376, an anticipated torque trajectory 604, the target throttle opening area 267, a volumetric efficiency 606 of the engine 102, a pressure 608 within the intake manifold 110, and a torque output 610 of the engine 102. The operating conditions are plotted with respect to an x-axis 612 that represents time.

At 614, the desired capacity module 372 switches the desired torque capacity 374 from full capacity to the reduced capacity. In response, the anticipated torque request module 308 adjusts the anticipated torque trajectory 604 to reflect an anticipated torque increase. In addition, the MPC module 312 increases the target throttle opening area 267 based on the anticipated torque increase. In turn, the manifold pressure 608 starts to increase. Further, the MPC module 312 decreases the volumetric efficiency 606 by adjusting the target intake and exhaust cam phaser positions 269, 270 such that the engine torque output 610 is not affected by the increase in the target throttle opening area 267.

At 616, the desired capacity module 372 switches the model torque capacity 376 from full capacity to the reduced capacity. In response, the MPC module 312 adjusts the target intake and exhaust cam phaser positions 269, 270 to increase the volumetric efficiency 606 and thereby increase the air per cylinder (APC) of the engine. In addition, the MPC module 312 initially increases the target throttle opening area 267, and then decreases the target throttle opening area 267 as the volumetric efficiency 606 increases. However, despite the decrease in the target throttle opening area 267, the engine torque output 610 increases due to the increase in the volumetric efficiency 606.

At 618, the cylinder actuator module 120 switches the actual torque capacity 602 from full capacity to the reduced capacity. In turn, the engine torque output 610 initially decreases and then increases as the volumetric efficiency 606 continues to increase. The desired capacity module 372 may switch the model torque capacity 376 at a time that causes the period of the increase in the engine torque output 610 before 618 to be equal to the period of the increase in the engine torque output 610 after 618.

Figure 7:
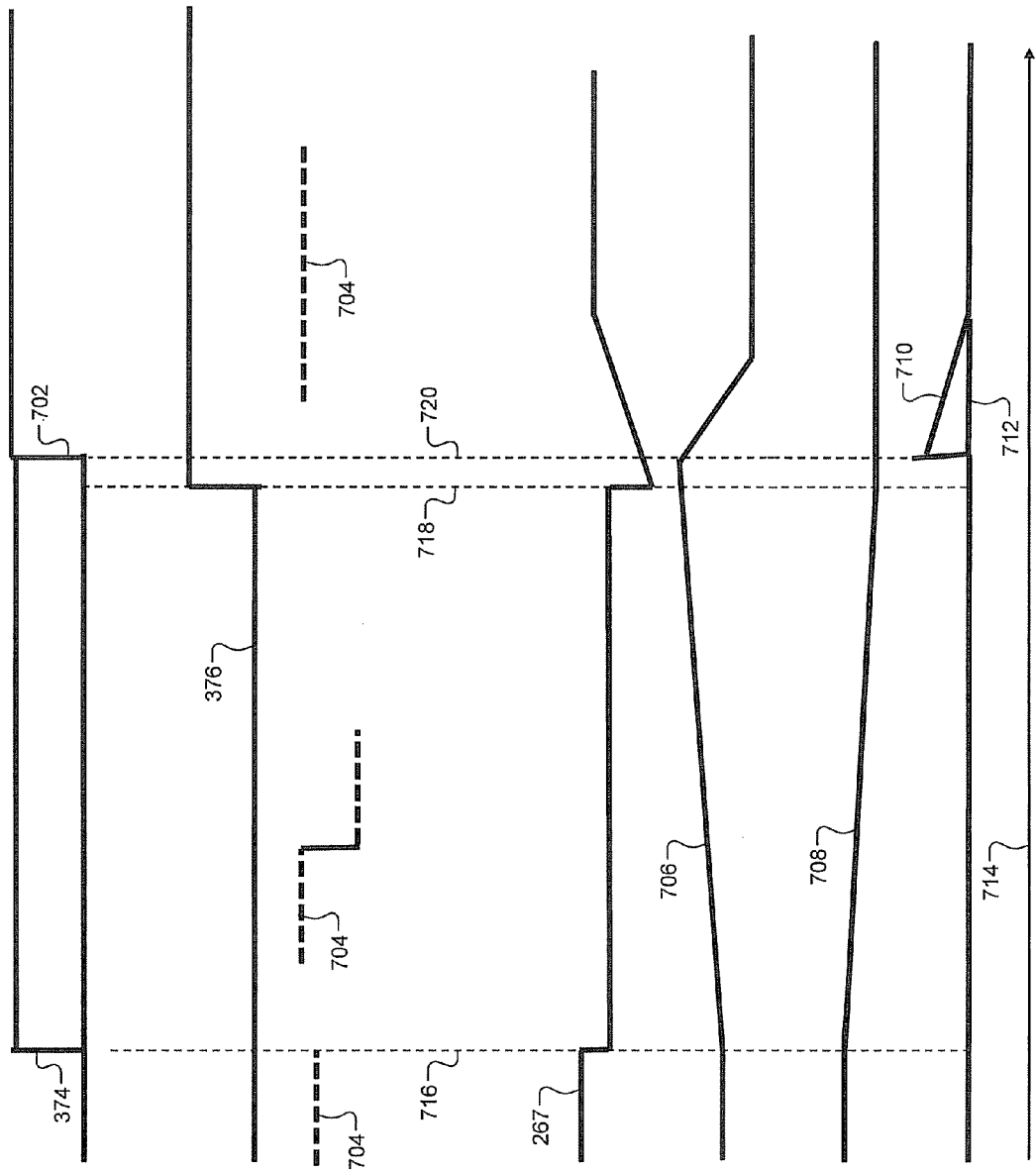

Referring now to FIG. 7, a graph illustrates actual and desired operating conditions of the engine 102 as the torque capacity of the engine 102 is switched from a reduced capacity to a full capacity using MPC (model predictive control). The operating conditions include the desired torque capacity 374, an actual torque capacity 702 of the engine 102, the model torque capacity 376, an anticipated torque trajectory 704, the target throttle opening area 267, a volumetric efficiency 706 of the engine 102, a pressure 708 within the intake manifold 110, a torque output 710 of the engine 102 based on air actuator values, and an actual torque output 712 of the engine 102. The operating conditions are plotted with respect to an x-axis 714 that represents time.

At 716, the desired capacity module 372 switches the desired torque capacity 374 from the reduced capacity to full capacity. In response, the anticipated torque request module 308 adjusts the anticipated torque trajectory 704 to reflect an anticipated torque decrease. In addition, the MPC module 312 decreases the target throttle opening area 267 and gradually increases the volumetric efficiency 706 by adjusting the target intake and exhaust cam phaser positions 269, 270. In turn, the manifold pressure 708 starts to decrease.

At 718, the desired capacity module 372 switches the model torque capacity 376 from the reduced capacity to full capacity. In response, the MPC module 312 initially decreases the target throttle opening area 267, and then increases the target throttle opening area 267 as the volumetric efficiency 706 continues to increase.

At 720, the cylinder actuator module 120 switches the actual torque capacity 702 from the reduced capacity to full capacity. In turn, the engine torque output 710 based on the air actuator values increases since the air actuators have not yet been adjusted to decrease the amount of airflow provided to each cylinder of the engine 102. However, an increase in the actual torque output 712 may be prevented by, for example, retarding the target spark timing 286.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A system comprising:
   a desired capacity module that generates a desired torque capacity of an engine at a future time based on a present torque request and a maximum torque output of the engine;
   an anticipated torque request module that generates an anticipated torque request based on the desired torque capacity; and
   an engine actuator module that controls an actuator of the engine at a present time based on the anticipated torque request.

2. The system of claim 1 wherein the desired capacity module switches the desired torque capacity to one of a first torque capacity and a second torque capacity before switching a target torque capacity of the engine at the present time to the one of the first torque capacity and the second torque capacity.

3. The system of claim 2 wherein the desired capacity module:
determines a first torque threshold based on the maximum torque output of the engine when the engine is operating at the second torque capacity; and
switches the target torque capacity from the first torque capacity to the second torque capacity when the present torque request is less than the first torque threshold.

4. The system of claim 3 wherein the desired capacity module:
determines a second torque threshold based on the maximum torque output of the engine when the engine is operating at the second torque capacity; and
switches the target torque capacity from the second torque capacity to the first torque capacity when the present torque request is greater than the second torque threshold, wherein the second torque threshold is greater than the first torque threshold.

5. The system of claim 4 further comprising:
a prediction module that:
generates a first predicted engine output torque based on a model of the engine and a first set of possible target values determined based on the present torque request and the anticipated torque request; and
generates a second predicted engine output torque based on the model of the engine and a second set of possible target values determined based on the present torque request and the anticipated torque request;
a cost module that:
determines a first cost for the first set of possible target values based on a first predetermined weighting value, the first predicted engine output torque, the present torque request, and the anticipated torque request; and
determines a second cost for the second set of possible target values based on the first predetermined weighting value, the second predicted engine output torque, the present torque request, and the anticipated torque request; and
a selection module that selects one of the first and second sets based on the first and second costs and that sets target values based on the possible target values of the selected one of the first and second sets, wherein the engine actuator module controls the engine actuator based on a first one of the target values.

6. The system of claim 5 wherein the anticipated torque request includes a plurality of anticipated torque requests.

7. The system of claim 5 wherein the selection module selects the first set when the first cost is less than the second cost, and the selection module selects the second set when the second cost is less than the first cost.

8. The system of claim 5 wherein:
the desired capacity module switches a model torque capacity to the one of the first torque capacity and the second torque capacity after switching the desired torque capacity to the one of the first torque capacity and the second torque capacity and before switching the target torque capacity to the one of the first torque capacity and the second torque capacity; and
the prediction module selects the model of the engine from a plurality of models based on the model torque capacity.

9. The system of claim 8 further comprising a reference module that generates reference values based on the model torque capacity, wherein the cost module determines the first cost and the second cost further based on the reference values.

10. The system of claim 8 further comprising a setpoint module that generates air and exhaust setpoints for the engine based on the present torque request, the anticipated torque request, and the model torque capacity, wherein the cost module determines the first cost and the second cost based on the setpoints.

11. A method comprising:
generating a desired torque capacity of an engine at a future time based on a present torque request and a maximum torque output of the engine;
generating an anticipated torque request based on the desired torque capacity; and
controlling an actuator of the engine at a present time based on the anticipated torque request.

12. The method of claim 11 further comprising switching the desired torque capacity to one of a first torque capacity and a second torque capacity before switching a target torque capacity of the engine at the present time to the one of the first torque capacity and the second torque capacity.

13. The method of claim 12 further comprising:
determining a first torque threshold based on the maximum torque output of the engine when the engine is operating at the second torque capacity; and
switching the target torque capacity from the first torque capacity to the second torque capacity when the present torque request is less than the first torque threshold.

14. The method of claim 13 further comprising:
determining a second torque threshold based on the maximum torque output of the engine when the engine is operating at the second torque capacity; and
switching the target torque capacity from the second torque capacity to the first torque capacity when the present torque request is greater than the second torque threshold, wherein the second torque threshold is greater than the first torque threshold.

15. The method of claim 14 further comprising:
generating a first predicted engine output torque based on a model of the engine and a first set of possible target values determined based on the present torque request and the anticipated torque request;
generating a second predicted engine output torque based on the model of the engine and a second set of possible target values determined based on the present torque request and the anticipated torque request;
determining a first cost for the first set of possible target values based on a first predetermined weighting value, the first predicted engine output torque, the present torque request, and the anticipated torque request;
determining a second cost for the second set of possible target values based on the first predetermined weighting value, the second predicted engine output torque, the present torque request, and the anticipated torque request;
selecting one of the first and second sets based on the first and second costs and that sets target values based on the possible target values of the selected one of the first and second sets; and
controlling the engine actuator based on a first one of the target values.

16. The method of claim 15 wherein the anticipated torque request includes a plurality of anticipated torque requests.

17. The method of claim 15 further comprising:
selecting the first set when the first cost is less than the second cost; and selecting the second set when the second cost is less than the first cost.

18. The method of claim 15 further comprising:

switching a model torque capacity to the one of the first torque capacity and the second torque capacity after switching the desired torque capacity to the one of the first torque capacity and the second torque capacity and before switching the target torque capacity to the one of the first torque capacity and the second torque capacity; and selecting the model of the engine from a plurality of models based on the model torque capacity.

19. The method of claim 18 further comprising:

generating reference values based on the model torque capacity; and determining the first cost and the second cost further based on the reference values.

20. The method of claim 18 further comprising:

generating air and exhaust setpoints for the engine based on the present torque request, the anticipated torque request, and the model torque capacity; and determining the first cost and the second cost based on the setpoints.

\* \* \* \* \*